United States Patent [19]

Ishibashi et al.

[11] Patent Number: 5,288,369
[45] Date of Patent: Feb. 22, 1994

[54] DEINKING METHOD AND DEINKING COMPOSITION

[75] Inventors: Yoichi Ishibashi; Yoshitaka Miyauchi; Koji Hamaguchi; Hideaki Urushibata; Hiromichi Takahashi; Takanobu Shiroishi, all of Wakayama, Japan

[73] Assignee: Kao Corporation, Tokyo, Japan

[21] Appl. No.: 796,608

[22] Filed: Nov. 22, 1991

Related U.S. Application Data

[63] Continuation-in-part of Ser. No. 730,042, Jul. 15, 1991, abandoned.

[30] Foreign Application Priority Data

| Dec. 28, 1990 | [JP] | Japan | 2-409283 |
| Mar. 7, 1991 | [JP] | Japan | 3-41883 |
| Mar. 7, 1991 | [JP] | Japan | 3-41884 |
| Mar. 7, 1991 | [JP] | Japan | 3-41885 |
| Mar. 7, 1991 | [JP] | Japan | 3-41886 |
| Mar. 29, 1991 | [JP] | Japan | 3-66498 |

[51] Int. Cl.$^5$ .............................. D21C 5/02
[52] U.S. Cl. ............................. 162/5; 252/60; 252/174.21; 252/174.22
[58] Field of Search .......... 162/5; 252/174.21, 174.22, 252/60, 61

[56] References Cited

U.S. PATENT DOCUMENTS

| 4,231,841 | 11/1980 | Calmanti et al. | 162/5 |
| 4,360,439 | 11/1982 | Calmanti et al. | 252/61 |
| 4,964,949 | 10/1990 | Hamaguchi et al. | 162/5 |

FOREIGN PATENT DOCUMENTS

| 3401444 | 7/1984 | Fed. Rep. of Germany . |
| 3435236 | 1/1985 | Fed. Rep. of Germany . |
| 0015590 | 1/1984 | Japan . |
| 59-15590 | 1/1984 | Japan . |
| 1028094 | 2/1986 | Japan . |
| 2177291 | 8/1987 | Japan . |
| 250291 | 10/1987 | Japan . |

OTHER PUBLICATIONS

Abstract Bulletin of the Institute of Paper Chemistry: vol. 49, No. 11, 1979, p. 1055: Bechstein, G., Use of Surface-active agents in Deinking Waster Paper.
World Patent Index Latest, Week 8736, Derwent Pub. Ltd., London, GB: Class A AN 87-254903, 1987.
World Patents Index Latest, Week 8749, Derwent Pub. Ltd., London, GB: Class A AN 87-345797, 1987.
World Patents Index Latest, Week 8410, Derwent Pub. Ltd., London, GB: AN 84-058751, 1984.

*Primary Examiner*—Asok Pal
*Assistant Examiner*—P. Achutamurthy
*Attorney, Agent, or Firm*—Birch, Stewart, Kolasch & Birch

[57] ABSTRACT

A deinking composition for use in the reclamation of waste paper consisting essentially of a mixture of higher fatty acids having 8 to 24 carbon atoms, or salts thereof, wherein the average carbon atom number of said fatty acids in said mixture ranges from 12.7 to 21.5, and wherein the content of higher fatty acids having 20 to 24 carbon atoms or salts thereof, ranges from 9.6 to 70.6% by weight, said mixture having an iodine value (IV) of not greater than 45.

6 Claims, No Drawings

DEINKING METHOD AND DEINKING COMPOSITION

This application is a continuation-in-part of application Ser. No. 07/730,042 filed on Jul. 15, 1991, abandoned.

DETAILED DESCRIPTION OF THE INVENTION

1. Field of Industrial Application

This invention relates to a deinking agent and deinking method to be used for the reclamation of waste papers including newspapers, magazines and office automation (OA) waste papers. More particularly, it relates to a deinking agent whereby a deinked pulp having a high b value and contaminated with little unliberated ink can be obtained by deinking, for example, newspapers, magazines or OA waste papers through the flotation method, the washing method or a procedure which utilizes portions of both methods thereof.

2. Description of the Related Art

It has been a current practice to reclaim waste papers including newspapers, magazines and OA waste papers. Recently the effective utilization of waste papers has become more and more important in conjunction with the problems of the earth environment such as the conservation of forest resources and refuse disposal. Further, it has been attempted to apply deinked pulp for better purposes for example, from old newspapers to making paper of moderate grade. On the other hand, recent improvements in printing techniques, printing systems and printing ink compositions have made it difficult to deink waste papers. In order to facilitate deinking, therefore, attempts have been made to improve deinking devices. In order to remove inks and other impurities from waste paper, there have been used alkaline agents such as caustic soda, sodium silicate, sodium carbonate and sodium phosphate; bleaching agents such as hydrogen peroxide, hydrosulfites and hypochlorites; and sequestering agents such as EDTA and DTPA, together with deinking agents including anionic surfactants such as alkylbenzenesulfonates, higher alcohol sulfates, α-olefinsulfonates and dialkyl sulfosuccinates, ethylene oxide adducts of higher alcohols, alkylphenols and fatty acids, and nonionic surfactants such as alkanolamides, either alone or in the form of a mixture thereof. Although these deinking agents show excellent foaming properties in the flotation treatment, their abilities to collect ink are limited. In the washing method, on the other hand, they are poor in detergency and, furthermore, the good foaming properties thereof cause problems in draining. As a result, only a low grade deinked pulp can be obtained thereby. Even though a pulp of high whiteness is obtained, the dark color restricts the utilization of the deinked pulp (for example, it can only be employed in a decreased amount under the surface of cardboard or added in a decreased amount to newspapers). Alternatively, it is unavoidable to elevate the amount of a bleaching agent so as to do away with the darkness. In order to obtain a deinked pulp of a not dark but light color tone, it is required to elevate the b value of the Lab color space of Hunter's color difference formula. A deinked pulp having a high b value means that fine ink spots of 4 μm or below have been removed at a high ratio. The color tone of the pulp is lightened with an increase in b value. As a result, it becomes possible to lower the content of a bleaching agent such as hydrogen peroxide, to use the deinked pulp at a high ratio and to apply the deinked pulp to a purpose of a higher grade.

There are two methods for elevating the b value. One of them comprises efficiently removing the fine ink spots of 4 μm or below, while the other comprises using a large amount of an alkali. However, the latter method suffers from some disadvantages including increases in sticky matters, the drainage load, and the brittleness of the pulp. Although there have been reported some techniques regarding the former method, i.e. collecting and removing the fine ink spots of 4 μm or below, neither method can provide a satisfactory effect.

Fatty acids have been known for a long time as deinking agents having a high ability to collect ink. For example, Japanese Patent No. 80988, Japanese Patent No. 82089 and Japanese Patent No. 83901 each disclose the use of a fatty acid in the form of soap as a deinking agent of a high ability to collect ink. However, the use of known fatty acids or salt(s) thereof is disadvantageous in that a large amount of ink remains unliberated.

Recently, a deinking agent having a high performance comprising a compound, to which an alkylene oxide such as ethylene oxide or propylene oxide has been added, and capable of substantially improving the whiteness of a deinked pulp has been invented (Japanese Patent Laid-Open No. 109696/1983 and Japanese Patent Laid-Open No. 130400/1984).

However, it is impossible to obtain a deinked pulp of a high b value by using any deinking agent disclosed in the above literature.

U.S. Pat. No. 4,231,841 discloses a deinking agent which includes five essential components. Example 1 of the specification discloses a deinking agent composition which consists of (A) 21% by weight of a sodium salt of higher fatty acid, (B) 17% by weight of a nonionic surfactant, (C) 5% by weight of a sodium linear alkylbenzene sulfonate, (D) 3% by weight of sodium carboxymethylcellulose and (E) 54% by weight of sodium metasilicate.

However, when a higher fatty acid of the present invention is combined with an alkylbenzene sulfonate, which is an essential component (C) of the deinking agent of U.S. Pat. No. 4,231,841, brightness of the deinked paper goes down remarkably due to dispersibility of the alkylbenzene sulfonate, and both b value of the paper and retention of pulp decrease. These deteriorations are more remarkable when used water (white water) is recycled in actual field.

On the contrary, when the higher fatty acid of the invention is used independently, unexpected and superior deinking performance can be accomplished in comparison when combined with alkylbenzene sulfonate. deinking performance can be accomplished in comparison when combined with alkylbenzene sulfonate.

SUMMARY OF THE INVENTION

The present inventors have conducted extensive studies in order to develop a deinking agent and deinking method which results in good deinking performance and a good workability in the flotation method, washing method or a procedure which utilizes portions of both aforesaid procdeures, and thus results in a deinked pulp having, in particular, a high b value and which is contaminated with little unliberated ink. As a result, they have surprisingly found out that these problems can be solved by using a mixture consisting essentially of higher fatty acid(s) having 8 to 24 carbon atoms or salt(s) thereof, wherein the average carbon atom number of the fatty acid(s) or salt(s) thereof ranges from 12.7 to 22.5, the content of higher fatty acid(s) having 20 to 24 carbon atoms or salt(s) thereof ranges from 9.6 to 70.6% by weight and the iodine value (IV) is not more than 45.

Accordingly, the present invention provides for a deinking agent consisting essentially of a mixture of higher fatty acid(s) having 8 to 24 carbon atoms or salt(s) thereof, wherein the average carbon atom number of the fatty acids in said mixture ranges from 12.7 to 22.5, the content of higher fatty acid(s) having 20 to 24 carbon atoms or salt(s) thereof ranges from 9.6 to 70.6% by weight and the iodine value (IV) is not more than 45, as an essential component.

Accordingly, the present invention provides a deinking method which comprises adding a deinking agent consisting essentially of a mixture of (b) higher fatty acid(s) having 8 to 24 carbon atoms or salt(s) thereof, wherein the average carbon atom number of the fatty acids in the mixture ranges from 12.7 to 22.5, the content of higher fatty acid(s) having 20 to 24 carbon atoms or salt(s) thereof ranges from 9.6 to 70.6% by weight and the iodine value (IV) is not more than 45, as an essential component in a process for the reclamation of waste papers.

The higher fatty acid of the present invention is known as a component of a deinking agent composition which consists of five components.

The present invention also provides a deinking agent consisting essentially of components (a) and (b). Namely the invention relates to a deinking method which comprises adding at least one surfactant (a) selected from the group consisting of compounds represented by the following general formulae (a-1) to (a-3) and a reaction product (a-4) obtained by adding an alkylene oxide to a mixture of a natural fat with a polyhydric alcohol, together with the component (b), in a process for the reclamation of waste papers:

$$R_1\!-\!O\!-\!(\!-\!AO\!-\!)_p\!-\!H \qquad (a\text{-}1)$$

wherein $R_1$ represents an alkyl or alkenyl group having 8 to 24 carbon atoms or an alkylphenyl group having an alkyl group of 6 to 14 carbon atoms;

AO represents an alkylene oxide unit having 2 to 4 carbon atoms which may form either a block polymer chain or a random polymer chain when two or more of said alkylene oxide units are present; and p is a number of 1 or above so as to provide a total molecular weight of from 800 to 10,000;

$$R_2\!-\!COO\!-\!(\!-\!AO\!-\!)_m\!-\!H \qquad (a\text{-}2)$$

wherein $R_2$ represents an alkyl or alkenyl group having 7 to 23 carbon atoms;

AO represents an alkylene oxide unit having 2 to 4 carbon atoms which may form either a block copolymer chain or a random polymer chain when two or more of said alkylene oxide units are present; and m is a number of 1 or above so as to provide a total molecular weight of from 800 to 10,000; and $$R_3\!-\!O\!-\!(\!-\!AO\!-\!)_n\!-\!SO_3M \qquad (a\text{-}3)$$

wherein $R_3$ represents an alkyl, alkenyl or cycloalkyl group having 8 to 24 carbon atoms or an alkylphenyl group having an alkyl group of 8 to 12 carbon atoms;

AO represents an alkylene oxide unit having 2 to 4 carbon atoms which may form either a block polymer chain or a random polymer chain when two or more of said alkylene oxide units are present; and n ranges from 1 to 5; and M represents an alkali metal or ammonium.

In the method wherein components (a) and (b) are used, it is preferable that the weight ratios of the components (a-1) to (a-4) to component (b) each falls within the following range:

$$(a\text{-}1)/(b) = 10/90 - 90/10$$

$$(a\text{-}2)/(b) = 10/90 - 90/10$$

$$(a\text{-}3)/(b) = 5/95 - 30/70; \text{ and}$$

$$(a\text{-}4)/(b) = 10/90 - 70/30$$

In this method, component (a) may be added exclusively in a stage of disintegrating (pulping) waste papers while component (b) may be added exclusively during the mixing stage and/or during the flotation stage following the pulping stage.

The present invention moreover provides a deinking composition consisting essentially of the component (a) which is at least one member selected from the group consisting of (a-1), (a-2), (a-3) and (a-4) and the component (b), each being defined above.

Since the numerical values specified with respect to the fatty acid mixture according to the present invention are critical, any compound similar thereto can never exert the remarkable effects of the present invention unless it satisfies the specifications of the present invention. Therefore the specifications of the numerical values (for example, the carbon atom number of the compound) in the present invention is very important. As will be clearly shown in the Examples and Comparative Examples given hereinafter, a mixture of an average carbon atom number smaller than 12.7 has a poor effect of aggregating ink, which makes it impossible to obtain a deinked pulp of a high b value. When the average carbon atom number exceeds 22.5, on the other hand, the insufficient foaming properties in the flotation stage makes it difficult to remove the aggregated ink from the system. When the content of the fatty acids having 20 to 24 carbon atoms is smaller than 9.6% by weight, the effect of aggregating fine ink spots is deteriorated and thus any deinked pulp of a high b value cannot be obtained. When the content of said fatty acids exceeds 70.6% by weight, on the other hand, the deinking ability of the agent is weakened. As a result, the obtained pulp contains a large amount of unliberated ink and thus has a poor appearance. In the deinking agent of the present invention, fatty acids having 8 to 24 carbon atoms can be arbitrarily blended within the range as specified in the present invention. It is particularly preferable to contain 2.0 to 33.2% by weight of a fatty acid having 20 carbon atoms or a salt thereof and 9.5 to 32.0% by weight of a fatty acid having 22 carbon atoms or a salt thereof.

When the iodine value (IV) of the deinking agent exceeds 45, only insufficient foaming properties are achieved in the flotation stage and thus the aggregated ink on the foam layer can be hardly removed from the system. As a result, the obtained deinked pulp has low whiteness. In this case, furthermore, a large amount of unliberated ink remains in the pulp due to the poor ability to liberate ink.

As described above, the deinking agent of the present invention may arbitrarily contain fatty acid(s) having 8 to 24 carbon atoms or salt(s) thereof within the range as specified in the present invention. Particular examples of these materials include caprylic acid, pelargonic acid, capric acid, undecanoic acid, lauric acid, tridecanoic acid, myristic acid, pentadecanoic acid, palmitic acid, margaric acid, stearic acid, oleic acid, elaidic acid, acid, tricosanoic acid, tetracosanoic acid, coconut oil fatty acids, beef tallow fatty acids, palm oil fatty acids, tall oil fatty acids, rapeseed oil fatty acids, fish oil fatty acids, those obtained by semi-hardening or hardening these fatty acids and salts of all of these fatty acids. Examples of the salts include sodium, potassium, ammonium, magnesium and calcium salts. Among these materials, semi-hardened or hardened fish oil fatty acids or salts thereof are preferable from the viewpoints of cost and workability (i.e. usable alone). Examples of the fish oil, from which the fish oil fatty acids to be used in the present invention are obtained, include cod oil, sardine oil, saury oil, mackerel oil, herring oil, menhaden oil and those collected during the refining process of these fish oils.

There has been known the use of a higher fatty acid as a deinking agent. However, it has never been known hitherto that the aforesaid deinking effects can be achieved exclusively by using a mixture containing fatty acids of specific carbon atom numbers at a specific ratio. In the prior art, namely, higher fatty acids, which have been commonly used as an anionic surfactant or a starting material therefor originating from coconut oil or beef tallow, are merely employed without paying any attention to the carbon atom number. Thus, there has never been disclosed in the prior art, the use of higher fatty acids at a specific ratio. The fatty acid mixture disclosed in the present invention is used rather in the aforesaid patents nor in the Examples therein. Furthermore, the deinking agents described in the above literature comprise fatty acids having 12 to 18 carbon atoms as the main components, which evidently differ from the one claimed in the present invention.

As an example of the fatty acid to be used in the present invention, fish oil fatty acid or a salt thereof may be cited. Although the combined use of fish oil fatty acids having 20 or more carbon atoms is described in the prior arts (Japanese Patent Laid-Open No. 89394/1986 and Japanese Patent Laid-Open No. 250291/1987), no particular example thereof is disclosed in these patents. Further, the effects thereof described in these patents differ from the effects of the present invention (i.e., elevating the b value by removing fine ink spots of 4 μm or below). Furthermore, the fish oil fatty acids described in the above patents have an iodine value (IV) of approximately 175. Thus, the fish oil fatty acids per se cannot be used in the present invention because of the excessively high iodine value.

The deinking agent of the present invention can exert sufficient effects when employed alone. Thus, it is not required to use other surfactants together or to add an alkylene oxide. Accordingly, the invention disclosed herein, whereby not only a good deinking performance is achieved but also the production of the deinking agent and the blending thereof can be simplified, thus improving the commonness and safety of the product, is highly advantageous from an industrial viewpoint.

Most of the fatty acids to be used as a constituent of the deinking agent of the present invention originate from natural fats. Therefore these fatty acids may be produced by conventionally known methods, for example, Twitchell decomposition, moderate-pressure catalytic decomposition or high-pressure continuous decomposition. The iodine value (IV) may be usually lowered by hydrogenation with the use of a nickel catalyst at a high temperature under elevated pressure.

As described above, although the deinking agent of the present invention exerts sufficient deinking performance when it is used independently, the combination with other surfactants is not precluded unless other surfactants harm or impede the effect of the present invention, as in the case of alkylbenzene sulfonates which impedes the performance of the deinking agent and deinking methods of the present invention due to strong dispersibility.

The deinking agent of the present invention may be added at any stage of the deinking process to thereby provide a deinked pulp of improved qualities. It may be generally added during the mixing or flotation stage. Alternately, it may be added in both of these stages. When water of a particularly high hardness is used, it is preferable to add the deinking agent immediately before the flotation stage. When it is to be used in portions in each stage, it may be added in the pulping, kneading, dispersing, chemical mixing and refining stages. The ratio (by weight) of the amount of the deinking agent to be added in the former stages to that to be added in the latter ones may preferably range from 10/90 to 90/10, still preferably from 40/60 to 60/40. The deinking agent may be preferably added in such an amount that the workability is not deteriorated and the procedure may be effected economically. It may be preferably used in an amount of from 0.03 to 1.0% by weight based on the waste papers.

Although the working mechanism of the deinking agent of the present invention has not been clarified in detail, it is assumed to proceed as follows.

When the carbon atom number of a higher fatty acid is elevated, the adsorption of the deinking agent is oriented almost perpendicularly to the surface of fine ink spots. As a result, the density of the terminal functional groups of the deinking agent is lowered. Thus the absolute surface charge density thereof per unit area is lowered, which might promote the aggregation of the fine ink spots, in accordance with DLVO theory. When the content of higher fatty acids having 20 to 24 carbon atoms is lower than 9.6% by weight, the fine ink spots would hardly aggregate. When this content exceeds 70.6% by weight, on the other hand, a rapid decrease in the adsorption ratio of the deinking agent onto the ink surface would make the control of the ink-surface charge density by the deinking agent insufficient. As a result, the fine ink spots would hardly aggregate.

When the content of the higher fatty acids having 20 to 24 carbon atoms ranges from 9.6 to 70.6% by weight, therefore, the fine ink spots are aggregated and thus a deinked pulp of a high b value can be obtained.

The unliberated ink can be reduced by lowering the surface tension between the ink and cellulose. When the content of the higher fatty acids having 20 to 24 carbon atoms exceeds 70.6% by weight, the critical micelle concentration rapidly increases. In this case, therefore, the performance of the deinking agent is exerted below the critical micelle concentration during the practical deinking process. Thus any satisfactory deinking effect cannot be achieved.

As described above, the content of the higher fatty acids having 20 to 24 carbon atoms or salt(s) thereof should critically range from 9.6 to 70.6% by weight in order to achieve both an effect of collecting ink (giving a high b value) and an ability to reduce the unliberated ink.

When the iodine value is high, the deinking agent would be adsorbed on the surface of ink almost uniformly to thereby form a thin adsorption layer (approximately 10 A). Then the effect of the surface potential ($\zeta$-potential: $-30$ to $-40$ mV) of the ink per se becomes evident and thus the absolute surface charge density per unit area would not be lowered. As a result, the fine ink spot would hardly aggregate.

Therefore any deinked pulp of a high b value and contaminated with little unliberated ink cannot be obtained unless the numerical values fall within the ranges as specified in the present invention.

Next, the present invention wherein components (a) and (b) are used together will be described in detail.

Namely, a particular embodiment of the present invention relates to a deinking method which comprises adding at least one surfactant (a) selected from the group consisting of compounds represented by the following general formulae (a-1) to (a-3) and a reaction product (a-4) obtained by adding an alkylene oxide to a mixture of a natural fat with a polyhydric alcohol exclusively in a stage of disintegrating (pulping) waste papers and adding a mixture (b) comprising higher fatty acid(s) having 8 to 24 carbon atoms or salt(s) thereof, wherein the average carbon atom number of the fatty acid(s) or salt(s) thereof ranges from 12.7 to 22.5, the content of higher fatty acid(s) having 20 to 24 carbon atoms or salt(s) thereof ranges from 9.6 to 70.6% by weight and the iodine value (IV) is not more than 45, exclusively in a mixing stage and/or flotation stage following the disintegrating stage:

$$R_1\!-\!O\!-\!(-AO-)_p\!-\!H \qquad (a\text{-}1)$$

wherein $R_1$ represents an alkyl or alkenyl group having 8 to 24 carbon atoms or an alkylphenyl group having an alkyl group of 6 to 14 carbon atoms;

AO represents an alkylene oxide unit having 2 to 4 carbon atoms which may form either a block polymer chain or a random polymer chain when two or more of said alkylene oxide units are present; and p is a number of 1 or above so as to provide a total molecular weight of from 800 to 10,000;

$$R_2\!-\!COO\!-\!(-AO-)_m\!-\!H \qquad (a\text{-}2)$$

wherein $R_2$ represents an alkyl or alkenyl group having 7 to 23 carbon atoms;

AO represents an alkylene oxide unit having 2 to 4 carbon atoms which may form either a block polymer chain or a random polymer chain when two or more of said alkylene oxide units are present; and m is a number of 1 or above so as to provide a total molecular weight of from 800 to 10,000; and

$$R_3\!-\!O\!-\!(-AO-)_n\!-\!SO_3M \qquad (a\text{-}3)$$

wherein $R_3$ represents an alkyl, alkenyl or cycloalkyl group having 8 to 24 carbon atoms or an alkylphenyl group having an alkyl group of 8 to 12 carbon atoms; AO represents an alkylene oxide having 2 to 4 carbon atoms which may form either a block polymer chain or a random polymer chain when two or more of said alkylene oxide units are present; and n ranges from 1 to 5; and M represents an alkali metal or ammonium.

Now the present invention wherein components (a) and (b) are used together, involving the aforesaid particular embodiment, will be described in detail. Component (b) is described above.

Since the numerical values specified with respect to the compounds (a-1) to (a-4) relating to the present invention are critical ones, any compound similar thereto cannot exert any remarkable effect of the present invention unless it satisfies the specification of the present invention. Therefore the specification of the functional groups or numerical values of the compounds of the general formulae (a-1) to (a-3) in the present invention is very important.

When $R_1$ in the general formula (a-1) is an alkyl or alkenyl group having less than 8 carbon atoms, the resulting deinking agent shows a limited ability to collect ink and thus, any deinked pulp of a high whiteness cannot be obtained thereby. When the carbon atom number of $R_1$ exceeds 24, on the other hand, the amount of the unliberated ink increases due to an insufficient liberation of ink from cellulose and thus, the obtained deinked pulp has a poor appearance.

The compound represented by the general formula (a-1) may be produced by a known method comprising adding an alkylene oxide to an alcohol. It is important that the total molecular weight of the alkylene oxide adduct of the alcohol ranges from 800 to 10,000, preferably from 1,000 to 4,000. This molecular weight is a number-average molecular weight determined by gel permeation chromatography (GPC) in terms of polyethylene glycol. When the molecular weight is less than 800, the deinking agent shows a poor ability to collect ink and thus any deinked pulp having high whiteness cannot be obtained thereby. When the molecular weight exceeds 10,000, on the other hand, the poor foaming properties on the liquid surface of a flotator makes it difficult to remove the aggregated ink from the system. As a result, the deinked pulp thus obtained shows poor whiteness.

As the alkylene oxide to be added to an alcohol, ethylene oxide (EO), propylene oxide (PO), butylene oxide (BO) or a mixture thereof may be used. It is particularly preferable to use a mixture of EO with PO having a molar ratio of EO to PO of from 0.5/1 to 3/1. It is preferable, furthermore, that the alkylene oxide(s) are added via random addition so as to relieve foaming troubles in the papermaking and draining stages.

As the alcohol to be used for producing the compound represented by the general formula (a-1), those having an alkyl or alkenyl group carrying 8 to 24 carbon atoms or those having an alkylphenyl group having an alkyl group carrying 6 to 14 carbon atoms may be used. Examples thereof include 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-heneicosanol, 1-docasanol, 1-tricosanol, 1-tetracosanol, 2-octanol, 2-nonanol, 2-decanol, 2-undecanol, 2-dodecanol, 2-tridecanol, 2-tetradecanol, 2-pentadecanol, 2-hexadecanol, 2-heptadecanol, 2-octadecanol, 2-nonadecanol, 2-eicosanol, 2-octen-1-ol, 2-dodecen-1-ol, 2-undecen-1-ol, 2-tetradecen-1-ol, 2- pentadecen-1-ol, 2-hexadecen-1-ol, 2-octadecen-1-ol, 8-nonen-1-ol, 10-undecen-1-ol, 11-dodecen-1-ol, 12-tridecen-1-ol, 15-hexadecen-1-ol, oleyl alcohol, elaidyl alcohol, linoleyl alcohol, linolenyl alcohol, eleostearyl alcohol, ricinoyl alcohol, cyclononanol, cyclodecanol, cyclourdecanol, cyclododecanol, cyclotridecanol, cyclotetradecanol, cyclopentadecanol, cyclohexadecanol, cycloheptadecanol, cyclooctadecanol, cyclononadecanol, cycloccsanol, octylphenol and nonylphenol.

As the compound represented by the general formula (a-1), those wherein $R_1$ has 14 to 24 carbon atoms are preferable and those wherein R is an alkyl group are further preferable.

When $R_2$ of the compound represented by the general formula (a-2) in the present invention has less than 7 carbon atoms, the resulting deinking agent has a poor ability to collect ink and thus, any deinked pulp having a high whiteness cannot be otained thereby. When the carbon atom number of R, exceeds 24, on the other hand, a large amount of unliberated ink remains due to the poor liberation of the ink from cellulose and thus, the obtained deinked pulp has a poor appearance.

The compound represented by the general formula (a-2) may be produced by a known method comprising adding an alkylene oxide to a fatty acid. Similar to the case of the compound represented by the general formula (a-I), it is important that the total molecular weight of the alkylene oxide adduct of the fatty acid ranges from 800 to 10,000, preferably from 1,000 to 4,000. When the molecular weight is less than 800, the poor ability to collect ink makes it impossible to obtain a deinked pulp of a high whiteness. When the molecular weight exceeds 10,000, on the other hand, the poor foaming properties on the liquid surface in a flotator makes it difficult to remove the aggregated ink from the system. As a result, the obtained deinked pulp shows a low whiteness.

As the alkylene oxide to be added to the fatty acid, EO, PO, BO or a mixture thereof may be used. It is particularly preferable to use a mixture of EO with PO having a molar ratio of EO to PO of from 0.5/1 to 3/1. It is preferable, furthermore, that the alkylene oxide(s) are added via random addition so as to relieve foaming troubles in the papermaking and draining stages.

As the fatty acid to be used for producing the compound represented by the general formula (a-1), those wherein $R_2$ has 7 to 23 carbon atoms may be used. Examples thereof include caprylic acid, pelargonic acid, capric acid, undecanoic acid, lauric acid, tridecanoic acid, myristic acid, pentadecanoic acid, palmitic acid, margaric acid, stearic acid, oleic acid, elaidic acid, linoleic acid, linolenic acid, stearolic acid, ricinolic acid, ricinelaidic acid, nonadecanoic acid, arachidic acid, heneiccsanoic acid, behenic acid, brassidic acid, erucic acid, tricosanoic acid, tetracosanoic acid, coconut oil fatty acids, beef tallow fatty acids, palm oil fatty acids, tall oil fatty acids, palm oil fatty acids, tall oil fatty acids, rapeseed oil fatty acids and fish oil fatty acids.

As the component represented by the general formula (a-2), those wherein $R_2$ has 11 to 23 carbon atoms are preferable and those wherein R is an alkyl group is still preferable.

It is important that the carbon atom number of $R_3$ of the compound represented by the general formula (a-3) in the present invention ranges from 8 to 24. When $R_3$ has less than 8 carbon atoms, the resulting deinking agent has a poor ability to collect ink and thus, any deinked pulp having a high whiteness cannot be obtained thereby. When the carbon atom number of $R_3$ exceeds 24, on the other hand, a large amount of the unliberated ink remains due to the poor liberation of the ink from cellulose and thus, the obtained deinked pulp has a poor appearance. The same applies to a case wherein $R_3$ is an alkylphenyl group having an alkyl group carrying 8 to 12 carbon atoms. Namely, when the alkyl group has less than 8 carbon atoms, the resulting deinking agent has a poor ability to collect ink and thus, any deinked pulp having a high whiteness cannot be obtained thereby. When the carbon atom number thereof exceeds 12, on the other hand, a large amount of the unliberated ink remains due to the poor liberation of the ink from cellulose and thus, the obtained deinked pulp has a poor appearance.

The compound represented by the general formula (a-3) may be produced by a known method comprising adding an alkylene oxide to an alcohol having an alkyl or alkenyl group carrying 8 to 24 carbon atoms or an alkylphenyl group having an alkyl group carrying 8 to 12 carbon atoms followed by the sulfonation and neutralization of the obtained adduct. Either a straight-chain alkyl group or a cyclic one may be used. Examples of such alcohols include 1-octanol, 1-nonanaol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosarol, 1-heneicosanol, 1-docosanol, 1-tricosanol, 1-tetracosanol, 2-octanol, 2-nonanol, 2-decanol, 2-undecanol, 2-dodecarol, 2-tridecanol, 2-tetradecanol, 2-pentadecanol, 2-hexadecanol, 2-heptadecanol, 2-octadecanol, 2-nonadecanol, 2-eicosarol, 2-heneicosanol, 2-docosanol, 2-tricosanol, 2-tetracosanol, 2-octen-1-ol, 2-dodecen-1-ol, 2-undecen-1-ol, 2-tetradecan-1-ol, 2-pentadecen-1-ol, 2-hexadecen-1-ol, 2-octadecen-1-ol, 8-nonen-1-ol, 10-undecen-1-ol, 11-dodeten-1-ol, 12-tridecen-1-ol, 15-hexadecen-1-ol, oleyl alcohol, elaidyl alcohol, linoleyl alcohol, linolenyl alcohol, eleostearyl alcohol, ricinoyl alcohol, cyclononanol, cyclodecanol, cycloundecanol, cyclododecanol, cyclotridecanol, cyclotetradecanol, cyclopentadecanol, cyclohexadecanol, cyclo-heptadecanol, cyclooctadecanol, cyclononadecanol, cycloccsanol, octylphenol and nonylphenol. An alcohol having an alkyl group is preferable therefor.

As the alkylene oxide to be added to the alcohol, EO, PO, BO or a mixture thereof may be used. It is particularly preferable to use a mixture of EO with PO having a molar ratio of EO to PO of from 1/1 to 5/1. The addition mole number of the alkylene oxide may preferably range from 1 to 5. When this number is smaller than 1, the poor foaming on the liquid surface of a flotator makes the removal of the aggregated ink from the system insufficient. As a result, the obtained deinked pulp has a low whiteness. When this number exceeds 5, on the other hand, the foam breakage of the flotation reject is deteriorated, which causes a back flow of the flotation reject toward the flotation cell. As a result, the degree of deinking is lowered and the obtained deinked pulp has a low whiteness and a low b value.

In the general formula (a-3), M represents an alkali metal, such as sodium or potassium, or ammonium.

The component (a-4) relating to the present invention is an alkylene oxide adduct of a mixture of a natural fat with a polyhydric alcohol. In the present invention, the mixing ratio of the natural fat to the polyhydric alcohol in the component (a-4) and the addition mole number of the alkylene oxide are highly important. It is desirable to add 5 mol or more, still preferably from 20 to 100 mol, of the alkylene oxide per mol of the natural fat. When the addition mol number of the alkylene oxide is less than 5, an insufficient foaming in the flotation stage makes it difficult to smoothly remove the aggregated ink from the system. In this case, the obtained deinked pulp has a low whiteness. The mixing ratio, on a molar basis, of the natural fat to the polyhydric alcohol may preferably range from 1/0.1 to ⅓, still preferably from 1/0.2 to ½. When this molar ratio exceeds 1/0.1, an insufficient foaming in the flotation stage makes it difficult to smoothly remove the aggregated ink from the system. As a result, it is sometimes observed that the obtained deinked pulp has a low whiteness. When the molar ratio is less than ⅓, on the other hand, the back flow of the flotation reject toward the flotation cell is induced. As a result, it is sometimes observed that the deinked pulp has a low whiteness and a low b value.

As the alkylene oxide to be added to the mixture of the natural fat with the polyhydric alcohol, EO, PO, BO or a mixture thereof may be used. It is particularly preferable to use EO and PO. Although different alkylene oxides may be either mixed with each other before the addition (random addition) or successively added (block addition), the random addition is preferred by taking foaming troubles in the papermaking and draining stages into consideration.

Examples of the natural fat to be used in the component (a-4) of the present invention include vegetable oils such as coconut oil, palm oil, olive oil, soybean oil, rapeseed oil and linseed oil, animal fats such as lard, beef tallow and bone oil, fish oils, those obtained by hardening or semi-hardening the above fats and those obtained during the refining process of these fats.

Examples of the polyhydric alcohol to be used in the component (a-4) of the present invention include ethylene glycol, propylene glycol, trimethylene glycol, butylene glycol, 1,6-hexane glycol, 2-ethylbutane-1,2,3-triol, glycerol, trimethylol-propane, trimethyfolethane, 1,2,4-butanetriol, 1,2,6-hexanetriol, 1,1,1-trimethylolhexane, tetramethylolcyclohexanol, diglycerol, mannitol, pentaerythritol, erythritol, arabitol, sorbitol, D-glycero-D-galactoheptose, D-glycero-D-glucoheptose, D-glycero-D-mannoheptose, D-glycero-L-mannoheptose, D-altroheptulose, D-mannoheptulose, D-altro-3-heptulose, D-glycero-D-galactoheptitol, D-erythro-D-galactitol, D-glycero-D-mannoctulose, D-erythro-L-gulononulose, cellobiose, maltose, lactose, gentianose, cellottiose and stachyose. It is particularly preferable to use di- to hexahydric alcohols.

The components (a-1) to (a-4) relating to the present invention may be added exclusively in the disintegrating (pulping) stage whereas the component (b) may be added exclusively in the mixing and/or flotation stages following the disintegrating stage to thereby achieve excellent effects. Although a deinked pulp of a certain degree of qualities may be obtained by adding a mixture of the components (a) and (b) or by adding the components (a) and (b) in the reverse order, it is disclosed therein that the method of the present invention makes it possible to obtain a deinked pulp which has a high whiteness and a high b value and is contaminated with little unliberated ink.

In the present invention, the ratio of each of the components (a-1) to (a-4) to the component (b) to be added are also important. More specifically, the ratios, on a weight basis, of these components may preferably fall within the ranges as specified below:

$(a\text{-}1)/(b) = 10/90 - 90/10$, preferably $40/60 - 60/40$;

$(a\text{-}2)/(b) = 10/90 - 90/10$, preferably $40/60 - 60/40$;

$(a\text{-}3)/(b) = 5/95 - 30/70$, preferably $10/90 - 25/75$;

and $(a\text{-}4)/(b) \leq 10/90 - 30/70$, preferably $20/80 - 50/50$.

When each weight ratio is above the lower limit as specified above, the liberation of ink from cellulose is further improved and thus the amount of the unliberated ink is decreased. When this weight ratio is below the upper limit as specified above, on the other hand, the ability to collect ink is enhanced and thus the obtained deinked pulp has a higher whiteness and a higher b value. When the weight ratio of (a-3)/(b) is below the upper limit, in particular, the foam breakage in the flotation reject is highly improved and thus a back flow of the flotation reject toward the flotation cell might hardly occur. As a result, the deinking ratio is elevated and a deinked pulp of a high whiteness and a high b value can be obtained.

The total amount of the components (a) and (b) to be added in the present invention may preferably fall within such a range that the workability of the process is not deteriorated and the procedure can be economically performed. It may preferably range from 0.03 to 1.0% by weight based on the waste papers.

The invention will be illustrated by reference to the following examples. It is to be understood, however, that the invention is not limited solely to the particular example below.

EXAMPLE 1

In this Example, a deinking agent was added as a whole in the pulping stage.

Recovered waste newspapers were cut into pieces (2×5 cm) and a given amount thereof was fed into a bench disintegrator. Then water, 0.8% (based on the starting material) of caustic soda, 2.2% (based on the starting material) of sodium silicate No. 3, 3.5% (based on the starting material) of 30% hydrogen peroxide and 0.5% (based on the starting material) of each of the deinking agents listed in Table 1 were added thereto. After disintegrating at a pulp concentration of 15% at 45° C. for 12 minutes, the mixture was aged at 55° C. for 120 minutes. Next, the mixture was dehydrated with a high-speed dehydrator until the pulp concentration reached 23% and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of $CaCl_2$ and $MgCl_2$ (Ca/Mg=8/2 by mol).

The b value of the pulp sheet thus obtained was measured with a color difference meter and the unliberated ink spots contained therein were counted with an image analyzer (100×magnification).

tent of the higher fatty acids having 20 to 24 carbon atoms.

Each of the deinking agents listed in Table is prepared by blending individual fatty acids with each other in such a manner as to give a composition of a specified carbon atom number. The deinking agent No. 19 comprises stearic acid.

TABLE 1-1

| | No. | Average.C atom No. | Iodine value (IV) | Fatty acid carbon No. composition (wt. %) | | | | | | | | | |
|---|---|---|---|---|---|---|---|---|---|---|---|---|---|
| | | | | $C_8$ | $C_9$ | $C_{10}$ | $C_{11}$ | $C_{12}$ | $C_{13}$ | $C_{14}$ | $C_{15}$ | $C_{16}$ | |
| Invention products | 1 | 12.8 | 0.7 | 0.2 | 0.04 | 21.1 | 0.06 | 63.6 | 0.05 | 0.2 | 0.06 | 0.2 | |
| | 2 | 13.1 | 2.8 | 16.1 | 0.02 | 0.1 | 0.01 | 40.5 | 0.01 | 30.7 | 0 | 0.3 | |
| | 3 | 14.5 | 0.9 | 9.7 | 0.02 | 2.3 | 0.01 | 10.5 | 0.02 | 41.5 | 0.02 | 22.9 | |
| | 4 | 15.6 | 1.7 | 5.6 | 0.01 | 0.5 | 0.01 | 3.7 | 0.02 | 29.6 | 0.02 | 44.8 | |
| | 5 | 16.8 | 2.1 | 3.2 | 0 | 7.0 | 0 | 2.1 | 0 | 0.3 | 0 | 36.7 | |
| | 6 | 17.4 | 3.5 | 1.2 | 0 | 3.2 | 0 | 2.1 | 0 | 12.4 | 0 | 10.4 | |
| | 7 | 18.2 | 1.9 | 3.8 | 0 | 0 | 0 | 0.1 | 0 | 0.1 | 0 | 0.1 | |
| | 8 | 18.9 | 5.4 | 0.2 | 0 | 0.2 | 0 | 0.3 | 0 | 0.3 | 0 | 14.6 | |
| | 9 | 19.3 | 4.7 | 0.1 | 0 | 0.1 | 0 | 0.2 | 0 | 0.1 | 0 | 36.1 | |
| | 10 | 20.4 | 1.8 | 0 | 0 | 0 | 0 | 0.1 | 0 | 0.1 | 0 | 19.4 | |
| | 11 | 21.2 | 7.6 | 0 | 0 | 0 | 0 | 0 | 0 | 0.1 | 0 | 2.9 | |
| | 12 | 22.3 | 6.2 | 0 | 0 | 0 | 0 | 0 | 0 | 0 | 0 | 0 | |
| Comparative products | 13 | 9.7 | 1.8 | 89.1 | 0 | 0 | 0 | 0 | 0 | 0 | 0 | 0 | |
| | 14 | 10.4 | 2.7 | 34.4 | 0.04 | 45.4 | 0.06 | 8.9 | 0.04 | 3.2 | 0.02 | 1.8 | |
| | 15 | 12.5 | 1.9 | 0.2 | 0.05 | 33.5 | 0.05 | 51.5 | 0.02 | 0.3 | 0.04 | 0.3 | |
| | 16 | 12.8 | 3.4 | 1.1 | 0.04 | 9.1 | 0.06 | 76.8 | 0.04 | 2.6 | 0.02 | 2.1 | |
| | 17 | 13.2 | 6.7 | 16.0 | 0.02 | 0.1 | 0.01 | 27.7 | 0.04 | 45.9 | 0.01 | 0.9 | |
| | 18 | 17.3 | 4.2 | 1.2 | 0 | 3.3 | 0 | 2.1 | 0 | 12.6 | 0 | 11.2 | |
| | 19 | 18.0 | 1.7 | 0 | 0 | 0 | 0 | 0 | 0 | 0 | 0 | 0 | |
| | 20 | 19.4 | 2.8 | 0 | 0 | 0.5 | 0 | 0.8 | 0 | 15.7 | 0 | 12.0 | |
| | 21 | 22.4 | 5.1 | 0 | 0 | 0 | 0 | 0 | 0 | 0 | 0 | 0 | |
| | 22 | 23.9 | 7.3 | 0 | 0 | 0 | 0 | 0 | 0 | 0 | 0 | 0 | |
| | 23 | 24.0 | 1.0 | 0 | 0 | 0 | 0 | 0 | 0 | 0 | 0 | 0 | |

| | No. | Fatty acid carbon No. composition (wt. %) | | | | | | | | Content of $C_{20}$–$C_{24}$ fatty acids (wt. %) |
|---|---|---|---|---|---|---|---|---|---|---|
| | | $C_{17}$ | $C_{18}$ | $C_{19}$ | $C_{20}$ | $C_{21}$ | $C_{22}$ | $C_{23}$ | $C_{24}$ | |
| Invention products | 1 | 0.04 | 3.8 | 0.05 | 4.5 | 0.05 | 5.9 | 0.05 | 0.1 | 9.6 |
| | 2 | 0.01 | 0.4 | 0.05 | 4.7 | 0.05 | 6.9 | 0.05 | 0.1 | 11.8 |
| | 3 | 0.01 | 0.5 | 0.02 | 4.8 | 0.05 | 7.5 | 0.05 | 0.1 | 12.5 |
| | 4 | 0.01 | 0.6 | 0.03 | 5.1 | 0.05 | 9.8 | 0.05 | 0.1 | 12.8 |
| | 5 | 0.06 | 34.1 | 0.04 | 5.6 | 0.05 | 10.7 | 0.05 | 0.1 | 16.5 |
| | 6 | 0.04 | 52.8 | 0.06 | 5.8 | 0.05 | 11.4 | 0.05 | 0.5 | 17.8 |
| | 7 | 0.07 | 74.5 | 0.03 | 5.3 | 0.05 | 13.4 | 0.05 | 1.1 | 30.5 |
| | 8 | 0.05 | 47.0 | 0.05 | 15.4 | 0.05 | 18.1 | 0.05 | 3.7 | 37.3 |
| | 9 | 0 | 9.2 | 0.1 | 16.5 | 0.1 | 26.9 | 0.1 | 10.4 | 54.0 |
| | 10 | 0 | 17.6 | 0 | 17.9 | 0.1 | 21.2 | 0.1 | 23.5 | 62.8 |
| | 11 | 0 | 32.9 | 0 | 4.2 | 0.1 | 20.6 | 0.1 | 39.1 | 64.1 |
| | 12 | 0 | 18.4 | 11.6 | 0.2 | 0.1 | 0.2 | 0.1 | 69.4 | 70.0 |
| Comparative products | 13 | 0 | 0 | 0 | 0 | 0 | 0 | 0 | 10.9 | 10.9 |
| | 14 | 0.02 | 0.7 | 0.02 | 1.9 | 0 | 3.4 | 0 | 0.1 | 5.4 |
| | 15 | 0.01 | 3.4 | 0.03 | 4.3 | 0.05 | 6.1 | 0.05 | 0.1 | 10.6 |
| | 16 | 0.03 | 1.4 | 0.01 | 0 | 0 | 0 | 0 | 6.7 | 6.7 |
| | 17 | 0.02 | 0.5 | 0 | 3.5 | 0.05 | 5.8 | 0.05 | 0.1 | 9.5 |
| | 18 | 0.05 | 57.7 | 0.05 | 0.1 | 0 | 2.3 | 0 | 7.4 | 9.8 |
| | 19 | 0 | 100 | 0 | 0 | 0 | 0 | 0 | 0 | 0 |
| | 20 | 0 | 0.2 | 0.1 | 27.4 | 0.05 | 35.4 | 0.05 | 5.8 | 70.7 |
| | 21 | 0 | 0 | 0 | 0 | 0 | 86.7 | 0 | 13.3 | 100 |
| | 22 | 0 | 1.1 | 0 | 0.3 | 0.05 | 0.4 | 0.05 | 98.1 | 98.9 |
| | 23 | 0 | 0 | 0 | 0 | 0 | 0 | 0 | 100 | 100 |

The term "b value" as used herein means the value of b of the Lab space indication system in accordance with Hunter's color difference formula. The relation thereof with the tristimulus values (X, Y and Z) is as follows:

$$b = 7.0\,(Y - 0.8472)/\sqrt{Y}$$

As the above equation shows, the b value is a function of Y and Z. A positive b value means the intenseness of yellowness, while a negative one means that of blueness.

Table 2 shows the deinking performances of the deinking agents of the present invention achieved by varying the average carbon atom number and the con-

TABLE 2-1

| Deinking agent No. | | Qualities of deinked pulp | |
|---|---|---|---|
| | | b value (%) | unliberated ink No. |
| Invention products | 1 | 8.66 | 8 |
| | 2 | 8.79 | 10 |
| | 3 | 8.61 | 9 |
| | 4 | 9.06 | 8 |
| | 5 | 8.97 | 9 |
| | 6 | 8.91 | 10 |
| | 7 | 9.20 | 7 |
| | 8 | 9.45 | 5 |
| | 9 | 9.22 | 7 |
| | 10 | 9.02 | 10 |
| | 11 | 9.03 | 8 |
| | 12 | 8.74 | 9 |

TABLE 2-1-continued

| Deinking agent No. | Qualities of deinked pulp | |
|---|---|---|
| | b value (%) | unliberated ink No. |
| Comparative products | 13 | 6.56 | 29 |
| | 14 | 6.53 | 34 |
| | 15 | 6.61 | 33 |
| | 16 | 6.08 | 33 |
| | 17 | 6.54 | 31 |
| | 18 | 6.24 | 34 |
| | 19 | 6.82 | 30 |
| | 20 | 7.11 | 42 |
| | 21 | 7.63 | 31 |
| | 22 | 7.86 | 42 |
| | 23 | 7.85 | 48 |

EXAMPLE 2

In this Example, a deinking agent was added in portions in the pulping and chemical mixing stages.

Recovered waste newspapers were cut into pieces (2×5 cm) and a given amount thereof was fed into a bench disintegrator. Then water, 0.2% (based on the starting material) of the caustic soda and 0.1% (based on the starting material) of each of the deinking agents listed in Table 3 were added thereto. After disintegrating at a pulp concentration of 15% at 45° C. for 12 minutes, the mixture was aged at 55° C. for 120 minutes.

Next, the mixture was dehydrated with a high-speed dehydrator until the concentration reached 22%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Table 3 were added thereto. After adjusting the pulp concentration to 23% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.4% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of $CaCl_2$ and $MgCl_2$ (Ca/Mg=8/2 by mol).

The b value of the pulp sheet thus obtained was measured with a color different meter and the unliberated ink spots contained therein were counted with an image analyzer (100×magnification).

Table 4 shows the deinking performances achieved by changing the iodine values (IV) of the deinking agents.

Each of the deinking agents listed in Table 3 is prepared by blending individual fatty acids with each other in such a manner as to give a composition of a specified carbon atom number.

TABLE 3-1

| | No. | Average C atom No. | Iodine value (IV) | Fatty acid carbon No. composition (wt. %) | | | | | | | | |
|---|---|---|---|---|---|---|---|---|---|---|---|---|
| | | | | $C_8$ | $C_9$ | $C_{10}$ | $C_{11}$ | $C_{12}$ | $C_{13}$ | $C_{14}$ | $C_{15}$ | $C_{16}$ |
| Invention products | 24 | 12.8 | 1.7 | 0.2 | 0.04 | 21.1 | 0.06 | 63.6 | 0.05 | 0.2 | 0.06 | 0.2 |
| | 25 | 14.5 | 7.3 | 9.7 | 0.02 | 2.3 | 0.01 | 10.5 | 0.02 | 41.5 | 0.02 | 22.9 |
| | 26 | 15.6 | 18.9 | 5.6 | 0.01 | 0.5 | 0.01 | 3.7 | 0.02 | 29.6 | 0.02 | 44.8 |
| | 27 | 16.8 | 26.6 | 3.2 | 0 | 7.0 | 0 | 2.1 | 0 | 0.3 | 0 | 36.7 |
| | 28 | 18.9 | 44.8 | 0.2 | 0 | 0.2 | 0 | 0.3 | 0 | 0.3 | 0 | 14.6 |
| | 29 | 20.4 | 31.5 | 0 | 0 | 0 | 0 | 0.1 | 0 | 0.1 | 0 | 19.4 |
| | 30 | 22.3 | 5.2 | 0 | 0 | 0 | 0 | 0 | 0 | 0 | 0 | 0 |
| Comparative products | 31 | 12.8 | 46.9 | 0.2 | 0.04 | 21.1 | 0.06 | 63.6 | 0.05 | 0.2 | 0.06 | 0.2 |
| | 32 | 14.5 | 63.0 | 9.7 | 0.02 | 2.3 | 0.01 | 10.5 | 0.02 | 41.5 | 0.02 | 22.9 |
| | 33 | 15.6 | 79.1 | 5.6 | 0.01 | 0.5 | 0.01 | 3.7 | 0.02 | 29.6 | 0.02 | 44.8 |
| | 34 | 16.8 | 95.4 | 3.2 | 0 | 7.0 | 0 | 2.1 | 0 | 0.3 | 0 | 36.7 |
| | 35 | 18.9 | 138.1 | 0.2 | 0 | 0.2 | 0 | 0.3 | 0 | 0.3 | 0 | 14.6 |
| | 36 | 20.4 | 171.3 | 0 | 0 | 0 | 0 | 0.1 | 0 | 0.1 | 0 | 19.4 |

| | No. | Fatty acid carbon No. composition (wt. %) | | | | | | | | Content of $C_{20}$–$C_{24}$ fatty acids (wt. %) |
|---|---|---|---|---|---|---|---|---|---|---|
| | | $C_{17}$ | $C_{18}$ | $C_{19}$ | $C_{20}$ | $C_{21}$ | $C_{22}$ | $C_{23}$ | $C_{24}$ | |
| Invention products | 24 | 0.04 | 3.5 | 0.05 | 4.5 | 0.05 | 6.2 | 0.05 | 0.1 | 10.9 |
| | 25 | 0.01 | 0.5 | 0.02 | 4.8 | 0.05 | 7.5 | 0.05 | 0.1 | 12.5 |
| | 26 | 0.01 | 0.6 | 0.03 | 5.1 | 0.05 | 9.8 | 0.05 | 0.1 | 12.8 |
| | 27 | 0.06 | 34.1 | 0.04 | 5.6 | 0.05 | 10.7 | 0.05 | 0.1 | 16.5 |
| | 28 | 0.05 | 47.0 | 0.05 | 15.4 | 0.05 | 18.1 | 0.05 | 3.7 | 39.3 |
| | 29 | 0 | 17.6 | 0 | 17.9 | 0.1 | 21.2 | 0.1 | 23.5 | 62.8 |
| | 30 | 0 | 18.4 | 11.6 | 0.2 | 0.1 | 0.2 | 0.1 | 69.4 | 70.0 |
| Comparative products | 31 | 0.04 | 3.5 | 0.05 | 4.5 | 0.05 | 6.2 | 0.05 | 0.1 | 10.9 |
| | 32 | 0.01 | 0.5 | 0.02 | 4.8 | 0.05 | 7.5 | 0.05 | 0.1 | 12.5 |
| | 33 | 0.01 | 0.6 | 0.03 | 5.1 | 0.05 | 9.8 | 0.05 | 0.1 | 12.8 |
| | 34 | 0.06 | 34.1 | 0.04 | 5.6 | 0.05 | 10.7 | 0.05 | 0.1 | 16.5 |
| | 35 | 0.05 | 47.0 | 0.05 | 15.4 | 0.05 | 18.1 | 0.05 | 3.7 | 39.3 |
| | 36 | 0 | 17.6 | 0 | 17.9 | 0.1 | 21.2 | 0.1 | 23.5 | 62.8 |

TABLE 4-1

| Deinking agent No. | Qualities of deinked pulp | |
|---|---|---|
| | b value (%) | unliberated ink No. |
| Invention products | 24 | 8.90 | 7 |
| | 25 | 8.94 | 8 |
| | 26 | 8.83 | 9 |
| | 27 | 8.79 | 9 |
| | 28 | 9.46 | 5 |
| | 29 | 9.01 | 7 |
| | 30 | 9.04 | 7 |

TABLE 4-1-continued

| Deinking agent No. | Qualities of deinked pulp | |
|---|---|---|
| | b value (%) | unliberated ink No. |
| Comparative products 31 | 7.16 | 29 |
| 32 | 7.23 | 32 |
| 33 | 7.05 | 35 |
| 34 | 6.85 | 36 |
| 35 | 6.25 | 51 |
| 36 | 6.47 | 48 |

EXAMPLE 3

In this Example, a deinking agent was added in portions in the pulping and kneading stages.

Recovered waste papers were cut into pieces (2×5 cm) and a given amount thereof was fed into a bench disintegrator. Then, water, 0.2% (based on the starting material) of caustic soda and 0.3% (based on the starting material) of each of the deinking agents listed in Table 5 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 22%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Table 5 were added thereto. After adjusting the pulp concentration to 23% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 10 dH with the use of $CaCl_2$ and $MgCl_2$ (Ca/Mg=8/2 by mol).

The b value of the pulp sheet thus obtained was measured with a color difference meter and the unliberated ink spots contained therein were counted with an image analyzer (100×magnification).

Table 6 shows the deinking performances of the deinking agents.

The deinking agents No. 37 to No. 40 listed in Table 5 were respectively obtained from hardened fatty acids of cod, sardine, saury and mackerel fish oils, while the deinking agent No. 41 was obtained by mixing the deinking agent No. 37 with the deinking agent No. 38 at a weight ratio of 50/50. The deinking agents No. 42 to No. 44 were obtained by changing the iodine value (IV) of the deinking agent No. 37. Further, the deinking agents Nos. 45 to No. 49 respectively comprised stearic acid, myristic acid, commercially available stearic acid (Lunac S-40; a product of Kao), hardened beef tallow fatty acids and sardine oil fatty acids (IV=175).

TABLE 5-1

| | No. | Average C atom No. | Iodine value (IV) | Fatty acid carbon No. composition (wt. %) | | | | | | | | |
|---|---|---|---|---|---|---|---|---|---|---|---|---|
| | | | | $C_8$ | $C_9$ | $C_{10}$ | $C_{11}$ | $C_{12}$ | $C_{13}$ | $C_{14}$ | $C_{15}$ | $C_{16}$ |
| Invention products | 37 | 18.5 | 0.3 | 0 | 0 | 0 | 0 | 0 | 0 | 2.9 | 0 | 36.9 |
| | 38 | 18.5 | 0.3 | 0 | 0 | 0 | 0 | 0 | 0 | 6.5 | 0 | 25.0 |
| | 39 | 19.0 | 0.3 | 0 | 0 | 0 | 0 | 0 | 0 | 6.9 | 0 | 19.0 |
| | 40 | 18.8 | 0.3 | 0 | 0 | 0 | 0 | 0 | 0 | 6.0 | 0 | 22.7 |
| | 41 | 18.5 | 0.3 | 0 | 0 | 0 | 0 | 0 | 0 | 4.2 | 0 | 31.0 |
| | 42 | 18.5 | 23.5 | 0 | 0 | 0 | 0 | 0 | 0 | 1.9 | 0 | 36.9 |
| | 43 | 18.5 | 44.8 | 0 | 0 | 0 | 0 | 0 | 0 | 1.9 | 0 | 36.9 |
| Comparative products | 44 | 18.5 | 47.5 | 0 | 0 | 0 | 0 | 0 | 0 | 1.9 | 0 | 36.9 |
| | 45 | 18.0 | 0.3 | 0 | 0 | 0 | 0 | 0 | 0 | 0 | 0 | 0 |
| | 46 | 14.0 | 0.3 | 0 | 0 | 0 | 0 | 0 | 0 | 100 | 0 | 0 |
| | 47 | 17.8 | 0.3 | 0 | 0 | 0 | 0 | 0 | 0 | 0 | 0 | 8.0 |
| | 48 | 16.5 | 0.3 | 0 | 0 | 0 | 0 | 0.2 | 0.1 | 29.3 | 0.1 | 6.2 |
| | 49 | 18.5 | 175.0 | 0 | 0 | 0 | 0 | 0 | 0 | 6.5 | 0 | 25.0 |

| | No. | Fatty acid carbon No. composition (wt. %) | | | | | | | | Content of $C_{20}$–$C_{24}$ fatty acids (wt. %) |
|---|---|---|---|---|---|---|---|---|---|---|
| | | $C_{17}$ | $C_{18}$ | $C_{19}$ | $C_{20}$ | $C_{21}$ | $C_{22}$ | $C_{23}$ | $C_{24}$ | |
| Invention products | 37 | 0 | 19.5 | 0 | 17.8 | 0 | 23.9 | 0 | 0 | 41.7 |
| | 38 | 0 | 27.6 | 0 | 20.2 | 19.1 | 0 | 1.6 | 40.9 | |
| | 39 | 0 | 23.0 | 0 | 22.7 | 0 | 27.5 | 0 | 0.9 | 51.1 |
| | 40 | 0 | 23.8 | 0 | 20.8 | 0 | 26.7 | 0 | 0 | 47.5 |
| | 41 | 0 | 23.6 | 0 | 19.0 | 0 | 21.5 | 0 | 0.8 | 41.3 |
| | 42 | 0 | 19.5 | 0 | 17.8 | 0 | 23.9 | 0 | 0 | 41.7 |
| | 43 | 0 | 19.5 | 0 | 17.8 | 0 | 23.9 | 0 | 0 | 41.7 |
| Comparative products | 44 | 0 | 19.5 | 0 | 17.8 | 0 | 23.9 | 0 | 0 | 41.7 |
| | 45 | 0 | 100 | 0 | 0 | 0 | 0 | 0 | 0 | 0 |
| | 46 | 0 | 0 | 0 | 0 | 0 | 0 | 0 | 0 | 0 |
| | 47 | 0 | 92.0 | 0 | 0 | 0 | 0 | 0 | 0 | 0 |
| | 48 | 0.1 | 63.8 | 0.1 | 0.1 | 0 | 0 | 0 | 0 | 0.1 |
| | 49 | 0 | 27.6 | 0 | 20.2 | 0 | 19.1 | 0 | 1.6 | 40.9 |

TABLE 6-1

| Deinking agent No. | Qualities of deinked pulp | |
|---|---|---|
| | b value (%) | unliberated ink No. |
| Invention products 37 | 9.52 | 2 |
| 38 | 9.65 | 2 |
| 39 | 9.64 | 2 |
| 40 | 9.63 | 2 |

TABLE 6-1-continued

| Deinking agent No. | | Qualities of deinked pulp | |
|---|---|---|---|
| | | b value (%) | unliberated ink No. |
| | 41 | 9.62 | 3 |
| | 42 | 9.46 | 4 |
| | 43 | 9.33 | 4 |
| Comparative | 44 | 7.82 | 12 |
| products | 45 | 7.52 | 29 |
| | 46 | 7.01 | 32 |
| | 47 | 7.43 | 28 |
| | 48 | 7.32 | 31 |
| | 49 | 6.02 | 54 |

EXAMPLE 4

In this Example, a deinking agent was added in portions in the pulping stage and before the flotation stage.

Recovered waste newspapers were cut into pieces (2×5 cm) and a given amount thereof was fed into a bench disintegrator. Then water, 0.2% (based on the starting material) of caustic soda and 0.2% (based on the starting material) of each of the deinking agents listed in Table 7 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 22%. Then 0.6% (based on the starting material) of caustic soda, 2.2% (based on the starting material) of sodium silicate No. 3 and 3.5% (based on the starting material) of 30% hydrogen peroxide were added thereto After adjusting the pulp concentration to 23% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. Then 0.3% (based on the starting material) of each of the deinking agents listed in Table 7 was added to the obtained pulp slurry. After diluting with water so as to give a pulp concentration of 1%, the slurry was subjected to flotation at 30.C for 10 minutes After the completion of the flotation, the pulp slurry was concentrated with a 60-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 40. dH with the use of $CaCl_2$ and $MgCl_2$ (Ca/Mg=8/2 by mol).

The b value of the pulp sheet thus obtained was measured with a color difference meter and the unliberated ink spots contained therein were counted with an image analyzer (100×magnification).

Table 8 shows the deinking performances of the deinking agents.

In Table 7, all of the fatty acids contained in the deinking agents were in the form of sodium salts. Each of the deinking agents No. 50 to 53, is prepared by blending individual sodium salts of the fatty acids with each other in such a manner as to give a composition of a specified carbon atom number. The deinking agent No. 54 comprised sodium stearate.

The deinking agents Nos. 60 and 61 are each prepared by blending calcium salts of fatty acids with each other so as to produce a composition having the specified carbon atoms number. The deinking agent No. 54 comprised sodium stearate and No. 62 comprised calcium stearate.

The hardness of the employed water was adjusted to 40. dH with the use of $CaCl_2$ and $MgCl_2$ (Ca/Mg=8/2 by mol).

The b value of the pulp sheet thus obtained was measured with a color difference meter and the unliberated ink spots contained therein were counted with an image analyzer (100×magnification).

Table 8 shows the deinking performances of the deinking agents.

In Table 7, all of the fatty acids contained in the deinking agents were in the form of sodium salts. Each of the deinking agents No. 50 to No. 53, is prepared by blending individual sodium salts of the fatty acids with each other in such a manner as to give a composition of a specified carbon atom number. The deinking agent No. 54 comprised sodium stearate.

TABLE 7-1

| | No. | Average C atom No. | Iodine value (IV) | Fatty acid carbon No. composition (wt. %) | | | | | | | | |
|---|---|---|---|---|---|---|---|---|---|---|---|---|
| | | | | $C_8$ | $C_9$ | $C_{10}$ | $C_{11}$ | $C_{12}$ | $C_{13}$ | $C_{14}$ | $C_{15}$ | $C_{16}$ |
| Invention | 50 | 19.8 | 0.4 | 0 | 0 | 0 | 0 | 0 | 0 | 7.8 | 0 | 14.0 |
| products | 51 | 18.0 | 5.2 | 0 | 0 | 0 | 0 | 10.2 | 0 | 5.2 | 0 | 0 |
| | 52 | 17.7 | 4.2 | 0 | 10.3 | 0 | 8.9 | 0 | 6.4 | 0 | 8.8 | |
| | 53 | 18.9 | 3.2 | 0 | 0 | 0 | 0 | 0 | 0 | 0 | 0 | 16.9 |
| Comparative | 54 | 18.0 | 0 | 0 | 0 | 0 | 0 | 0 | 0 | 0 | 0 | 0 |
| products | 55 | | | stearyl alcohol $(EO)_{10}(PO)_{10}$ random adduct* | | | | | | | | |
| | 56 | | | stearic acid $(EO)_8(PO)_{25}$ block adduct* | | | | | | | | |
| | 57 | | | nonylphenol $(EO)_8$ adduct* | | | | | | | | |
| | 58 | | | sodium dodecylbenzenesulfonate | | | | | | | | |
| | 59 | | | sodium lauryl sulfate | | | | | | | | |
| Invention | 60 | 19.8 | 0.4 | 0 | 0 | 0 | 0 | 0 | 0 | 7.8 | 0 | 14.0 |
| | 61 | 18.0 | 5.2 | 0 | 0 | 0 | 0 | 10.2 | 0 | 5.2 | 0 | 0 |
| Comparative | 62 | 18.0 | 1.0 | 0 | 0 | 0 | 0 | 0 | 0 | 0 | 0 | 0 |

| | No. | Fatty acid carbon No. composition (wt. %) | | | | | | | | Content of $C_{20}$-$C_{24}$ fatty acids (wt. %) |
|---|---|---|---|---|---|---|---|---|---|---|
| | | $C_{17}$ | $C_{18}$ | $C_{19}$ | $C_{20}$ | $C_{21}$ | $C_{22}$ | $C_{23}$ | $C_{24}$ | |
| Invention | 50 | 0 | 17.4 | 0 | 18.1 | 0 | 20.3 | 0 | 22.4 | 60.8 |
| products | 51 | 0 | 60.3 | 0 | 8.0 | 0 | 16.3 | 0 | 0 | 24.3 |
| | 52 | 0 | 10.2 | 0 | 19.8 | 0 | 18.3 | 0 | 13.1 | 51.2 |
| | 53 | 0 | 42.3 | 0 | 19.8 | 0 | 20.9 | 0 | 0.1 | 40.8 |
| Comparative | 54 | 0 | 100 | 0 | 0 | 0 | 0 | 0 | 0 | 0 |
| parative | 55 | stearyl alcohol $(EO)_{10}(PO)_{10}$ random adduct* | | | | | | | | |

TABLE 7-1-continued

| products | 56 | stearic acid (EO)₈(PO)₂₅ block adduct* | | | | | | | |
|---|---|---|---|---|---|---|---|---|---|
| | 57 | nonylphenol (EO)₈ adduct* | | | | | | | |
| | 58 | sodium dodecylbenzenesulfonate | | | | | | | |
| | 59 | sodium lauryl sulfate | | | | | | | |
| Invention | 60 | 0 | 17.4 | 0 | 18.1 | 0 | 20.3 | 0 | 22.4 | 60.8 |
| | 61 | 0 | 60.3 | 0 | 8.0 | 0 | 16.3 | 0 | 0 | 24.3 |
| Comparative | 62 | 0 | 100 | 0 | 0 | 0 | 0 | 0 | 0 | 0 |

Note
*EO: ethylene oxide; PO: propylene oxide; the number represents the addition mole number.
*Nos. 51 and 52: calcium salts.

TABLE 8-1

| Deinking agent | | Qualities of deinked pulp | |
|---|---|---|---|
| | No. | b value (%) | unliberated ink No. |
| Invention process | 50 | 9.42 | 5 |
| | 51 | 9.43 | 5 |
| | 52 | 9.72 | 2 |
| | 53 | 9.61 | 2 |
| Comparative products | 54 | 7.51 | 28 |
| | 55 | 7.32 | 25 |
| | 56 | 7.01 | 23 |
| | 57 | 6.54 | 41 |
| | 58 | 6.50 | 35 |
| | 59 | 6.42 | 43 |
| invention | 60 | 9.40 | 5 |
| | 61 | 9.41 | 5 |
| Comparative product | 62 | 7.48 | 30 |

As the above Examples show, a deinked pulp having a high b value and contaminated with little unliberated ink can be obtained by using a mixture containing higher fatty acid(s) having 8 to 24 carbon atoms or salt(s) thereof, wherein the average carbon atom number of the fatty acids in the mixture ranges from 12.7 to 22.5, the content of higher fatty acid(s) having 20 to 24 carbon atoms or salt(s) thereof ranges from 9.6 to 70.6% by weight and the iodine value (IV) is not more than 45, as a deinking agent.

EXAMPLE 5

Recovered waste newspapers were cut into pieces (2×5 cm) and a given amount thereof was fed into a bench disintegrator. Then water, 1.5% (based on the starting material) of caustic soda, 1.3% (based on the starting material) of sodium silicate No. 3, 1.5% (based on the starting material) of 30% hydrogen peroxide and the deinking agents listed on Table 9 were added thereto. After disintegrating at a pulp concentration of 15% at 60° C. for 15 minutes, the mixture was aged at 55° C. for 120 minutes. After diluting with hot water so as to give a pulp concentration of 5%, it was disintegrated again with the bench disintegrator for 30 seconds. The obtained slurry was diluted with water so as to give a pulp concentration of 1% and then subjected to flotation at 50° C. for 7 minutes. After the completion of the flotation, the pulp slurry was concentrated with a 60-mesh wire to thereby give a concentration of 4%. Then it was diluted with water so as to give a pulp concentration of 1% and treated with a TAPPI standard sheet machine to thereby give a pulp sheet.

The b value and brightness of the pulp sheet thus obtained was measured with a color difference meter and the unliberated ink spots contained therein were counted with an image analyzer (100×magnification).

Table 10 shows the deinking performances.

TABLE 9

| No. | Deinking Agent | Amount (wt %) |
|---|---|---|
| 1 | higher fatty acid of the present invention | 0.6 |
| 2 | higher fatty acid | 0.5 |
| | sodium dodecylbenzene sulfonate | 0.1 |

TABLE 10

| No. | Brightness (%) | b-value (%) |
|---|---|---|
| 1 | 56.5 | 10.1 |
| 2 | 54.6 | 8.2 |

EXAMPLE 6

In this Example, a deinking agent was added as a whole in the pulping stage

Recovered waste newspapers were cut into pieces (2×5 cm) and a given amount thereof was fed into a bench disintegrator. Then water, 0.8% (based on the starting material) of caustic soda, 2.2% (based on the starting material) of sodium silicate No. 3, 3.5% (based on the starting material) of 30% hydrogen peroxide and 0.5% (based on the starting material) of each of the deinking agents listed in Tables 1 to 3 were added thereto. After disintegrating at a pulp concentration of 15% at 45° C. for 12 minutes, the mixture was aged at 55° C. for 120 minutes. Next, the mixture was dehydrated with a high-speed dehydrator until the pulp concentration reached 23% and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of CaCl₂ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of CaCl₂ and MgCl₂ (Ca/Mg=8/2 by mol.)

The whiteness and b value of the pulp sheet thus obtained were measured with a color difference meter and the unliberated ink spots contained therein were counted with an image analyzer (100×magnification).

Table 11 shows the average carbon atom number of the component (a), the iodine value, the fatty acid composition and the content of fatty acids having 20 to 24 carbon atoms of each of the deinking agents. Table 12 shows the component (b) and Table 13 shows the weight ratio of the components (a) to (b). Further, Table 14 shows the deinking performances.

TABLE 11

| | No. | Average C atom No. | Iodine value (IV) | Fatty acid carbon No. composition (wt. %) | | | | | | | | |
|---|---|---|---|---|---|---|---|---|---|---|---|---|
| | | | | $C_8$ | $C_9$ | $C_{10}$ | $C_{11}$ | $C_{12}$ | $C_{13}$ | $C_{14}$ | $C_{15}$ | $C_{16}$ |
| Invention products | 1 | 12.8 | 1.1 | 0.2 | 0.04 | 21.1 | 0.06 | 63.6 | 0.05 | 0.2 | 0.06 | 0.2 |
| | 2 | 13.1 | 1.4 | 16.1 | 0.02 | 0.1 | 0.01 | 40.5 | 0.01 | 30.7 | 0 | 0.3 |
| | 3 | 15.6 | 5.3 | 5.6 | 0.01 | 0.5 | 0.01 | 3.7 | 0.02 | 29.6 | 0.02 | 44.8 |
| | 4 | 16.8 | 3.6 | 3.2 | 0 | 7.0 | 0 | .2.1 | 0 | 0.3 | 0 | 36.7 |
| | 5 | 18.9 | 7.9 | 0.2 | 0 | 0.2 | 0 | 0.3 | 0 | 0.3 | 0 | 14.6 |
| | 6 | 20.4 | 4.8 | 0 | 0 | 0 | 0 | 0.1 | 0 | 0.1 | 0 | 19.4 |
| | 7 | 21.2 | 6.0 | 0 | 0 | 0 | 0 | 0 | 0 | 0.1 | 0 | 2.9 |
| | 8 | 22.3 | 1.2 | 0 | 0 | 0 | 0 | 0 | 0 | 0 | 0 | 0 |

| | No. | Fatty acid carbon No. composition (wt. %) | | | | | | | | Content of $C_{20}$-$C_{24}$ fatty acids (wt. %) |
|---|---|---|---|---|---|---|---|---|---|---|
| | | $C_{17}$ | $C_{18}$ | $C_{19}$ | $C_{20}$ | $C_{21}$ | $C_{22}$ | $C_{23}$ | $C_{24}$ | |
| Invention products | 1 | 0.04 | 3.8 | 0.05 | 4.5 | 0.05 | 5.9 | 0.05 | 0.1 | 9.6 |
| | 2 | 0.01 | 0.4 | 0.05 | 4.7 | 0.05 | 6.9 | 0.05 | 0.1 | 11.8 |
| | 3 | 0.01 | 0.6 | 0.03 | 5.1 | 0.05 | 9.8 | 0.05 | 0.1 | 12.8 |
| | 4 | 0.06 | 34.1 | 0.04 | 5.6 | 0.05 | 10.7 | 0.05 | 0.1 | 16.5 |
| | 5 | 0.05 | 47.0 | 0.05 | 15.4 | 0.05 | 18.1 | 0.05 | 3.7 | 37.3 |
| | 6 | 0 | 17.6 | 0 | 17.9 | 0.1 | 21.2 | 0.1 | 23.5 | 62.8 |
| | 7 | 0 | 32.9 | 0 | 4.2 | 0.1 | 20.6 | 0.1 | 39.1 | 64.1 |
| | 8 | 0 | 18.4 | 11.6 | 0.2 | 0.1 | 0.2 | 0.1 | 69.4 | 70.0 |

TABLE 12

| Deinking agent No. | | Component (b) |
|---|---|---|
| Invention products | 1 | $C_{12}H_{25}O(EO)_{10}(PO)_5H$ |
| | 2 | $C_{18}H_{37}O(EO)_{100}H$ |
| | 3 | 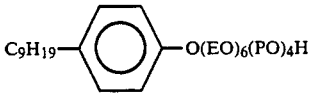 $C_9H_{19}$—⟨○⟩—$O(EO)_6(PO)_4H$ |
| | 4 | $C_{16}H_{33}O(PO)_{10}(EO)_{10}H$ |
| | 5 | $C_{18}H_{35}O(EO)_{50}(EO)_{30}H$ |
| | 6 | 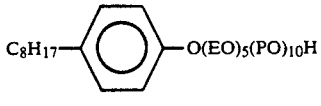 $C_8H_{17}$—⟨○⟩—$O(EO)_5(PO)_{10}H$ |
| | 7 | $C_{14}H_{29}O(EO)_{30}(EO)_{15}H$ |
| | 8 | $C_{10}H_{21}O(EO)_{10}(BO)_5H$ |

TABLE 13

| Deinking agent No. | | Weight ratio (a)/(b) |
|---|---|---|
| Invention products | 1 | 90/10 |
| | 2 | 80/20 |
| | 3 | 70/30 |
| | 4 | 65/35 |
| | 5 | 62/38 |
| | 6 | 53/47 |
| | 7 | 45/55 |
| | 8 | 40/60 |

TABLE 14

| Deinking agent No. | Qualities of deinked pulp | | |
|---|---|---|---|
| | whiteness (%) | b value (%) | unliberated ink no. |
| Invention products | | | |
| 1 | 55.2 | 9.97 | 5 |
| 2 | 55.3 | 9.98 | 7 |
| 3 | 55.4 | 9.86 | 7 |
| 4 | 55.7 | 10.1 | 6 |
| 5 | 56.3 | 10.2 | 4 |
| 6 | 55.6 | 10.1 | 6 |
| 7 | 55.5 | 10.0 | 5 |
| 8 | 55.4 | 10.0 | 5 |

EXAMPLE 7

In this Example, a deinking agent was added in portions in the pulping and chemical mixing stages.

Recovered waste newspapers were cut into pieces (2×5 cm) and a given amount thereof was fed into a bench disintegrator. Then water, 0.2% (based on the starting material) of caustic soda and 0.1% (based on the starting material) of each of the deinking agents listed in Tables 15 to 17 were added thereto. After disintegrating at a pulp concentration of 15% at 45° C. for 12 minutes, the mixture was aged at 55.C for 120 minutes. Next, the mixture was dehydrated with a high-speed dehydrator until the concentration reached 23%. Then 0.6% (based on the starting material) of caustic soda, 2.2% (based on the starting material) of sodium silicate No. 3, 3.5% (based on the starting material) of 30% hydrogen and 0.2% (based on the starting material) of each of the deinking agents listed in Tables 15 to 17 were added thereto. After adjusting the pulp concentration to 22% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30.C for 10 minutes. During the flotation process, 0.4% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Table 15 shows the average carbon atom number of the component (a), the iodine value, the fatty acid composition and the content of fatty acids having 20 to 24 carbon atoms of each of the deinking agents. Table 16 shows the component (b) and Table 17 shows the weight ratio of the components (a) to (b). Further, Table 18 shows the deinking performances.

TABLE 15

| No. | Average C atom No. | Iodine value (IV) | Fatty acid carbon No. composition (wt. %) | | | | | | | | |
|---|---|---|---|---|---|---|---|---|---|---|---|
| | | | $C_8$ | $C_9$ | $C_{10}$ | $C_{11}$ | $C_{12}$ | $C_{13}$ | $C_{14}$ | $C_{15}$ | $C_{16}$ |
| Invention products | | | | | | | | | | | |
| 17 | 12.8 | 40.1 | 0.2 | 0.04 | 21.1 | 0.06 | 63.6 | 0.05 | 0.2 | 0.06 | 0.2 |
| 18 | 15.6 | 1.5 | 5.6 | 0.01 | 0.5 | 0.01 | 3.7 | 0.02 | 29.6 | 0.02 | 44.8 |
| 19 | 18.9 | 0.8 | 0.2 | 0 | 0.2 | 0 | 0.3 | 0 | 0.3 | 0 | 14.6 |
| 20 | 20.4 | 17.4 | 0 | 0 | 0 | 0 | 0.1 | 0 | 0.1 | 0 | 19.4 |
| 21 | 22.3 | 6.7 | 0 | 0 | 0 | 0 | 0 | 0 | 0 | 0 | 0 |

| No. | Fatty acid carbon No. composition (wt. %) | | | | | | | | Content of $C_{20}$–$C_{24}$ fatty acids (wt. %) |
|---|---|---|---|---|---|---|---|---|---|
| | $C_{17}$ | $C_{18}$ | $C_{19}$ | $C_{20}$ | $C_{21}$ | $C_{22}$ | $C_{23}$ | $C_{24}$ | |
| Invention products | | | | | | | | | |
| 17 | 0.04 | 3.5 | 0.05 | 4.5 | 0.05 | 6.2 | 0.05 | 0.1 | 10.9 |
| 18 | 0.01 | 0.6 | 0.03 | 5.1 | 0.05 | 9.8 | 0.05 | 0.1 | 12.8 |
| 19 | 0.05 | 47.0 | 0.05 | 15.4 | 0.05 | 18.1 | 0.05 | 3.7 | 37.3 |
| 20 | 0 | 17.6 | 0 | 17.9 | 0.1 | 21.2 | 0.1 | 23.5 | 62.8 |
| 21 | 0 | 18.4 | 11.6 | 0.2 | 0.1 | 0.2 | 0.1 | 69.4 | 70.0 |

TABLE 16

| Deinking agent No. | | Component (b) |
|---|---|---|
| Invention products | 17 | $C_{12}H_{25}O(EO)_{80}H$ |
| | 18 | $C_{18}H_{37}O(EO)_{22}(PO)_{11}H$ |
| | 19 | $C_{18}H_{33}O(PO)_{10}(EO)_{10}H$ |
| | 20 | $C_{16}H_{33}O(PO)_{12}(BO)_6H$ |
| | 21 | 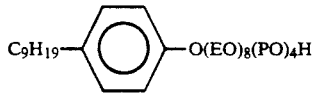 |

TABLE 17

| Deinking agent No. | Weight ratio (a)/(b) |
|---|---|
| Invention products | |
| 17 | 90/10 |
| 18 | 80/20 |
| 19 | 70/30 |
| 20 | 55/45 |
| 21 | 40/60 |

TABLE 18

| Deinking agent No. | Qualities of deinked pulp | | |
|---|---|---|---|
| | whiteness (%) | b value (%) | unliberated ink no. |
| Invention products | | | |
| 17 | 55.8 | 10.3 | 4 |
| 18 | 55.9 | 10.1 | 5 |
| 19 | 56.5 | 10.3 | 4 |
| 20 | 55.7 | 10.4 | 6 |

TABLE 18-continued

| Deinking agent No. | Qualities of deinked pulp | | |
|---|---|---|---|
| | whiteness (%) | b value (%) | unliberated ink no. |
| 21 | 55.8 | 10.2 | 6 |

EXAMPLE 8

In this Example, a deinking agent was added in portions in the pulping and kneading stages.

Recovered waste newspapers were cut into pieces (2×5 cm) and a given amount thereof was fed into a bench disintegrator. Then water, 0.2% (based on the starting material) of caustic soda and 0.3% (based on the starting material) of each of the deinking agents listed in Tables 19 to 21 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 23%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Tables 19 to 21 were added thereto. After adjusting the pulp concentration to 22% with water, the slurry was mixed in the bench disintegrator for 1 minutes and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 10° dH with the use of $CaCl_2$ and $MgCl_2$ (Ca/Mg=8/2 by mol).

The whiteness and b value of the pulp sheet thus obtained was measured with a color difference meter and the unliberated ink spots contained therein were counted with an image analyzer (100×magnification).

Table 19 shows the average carbon atom number of the component (a), the iodine value, the fatty acid composition and the content of fatty acids having 20 to 24 carbon atoms of each of the deinking agents. Table 20 shows the component (b) and Table 21 shows the weight ratio of the components (a) to (b). Further, Table 22 shows the deinking performances.

The components (a) listed in Table 19 were cod, sardine, saury and mackerel oil fatty acids (No. 26–No. 29) and the one of No. 30 was a mixture of No. 26 and No. 27 at a weight ratio of 50/50. Those of No. 31 to No. 33 were prepared by varying the iodine value (IV) of the one of No. 26.

TABLE 19

| No. | Average C atom No. | Iodine value (IV) | $C_8$ | $C_9$ | $C_{10}$ | $C_{11}$ | $C_{12}$ | $C_{13}$ | $C_{14}$ | $C_{15}$ | $C_{16}$ |
|---|---|---|---|---|---|---|---|---|---|---|---|
| Invention products | | | | | | | | | | | |
| 26 | 18.5 | 0.5 | 0 | 0 | 0 | 0 | 0 | 0 | 1.9 | 0 | 36.9 |
| 27 | 18.5 | 0.5 | 0 | 0 | 0 | 0 | 0 | 0 | 6.5 | 0 | 25.0 |
| 28 | 19.0 | 0.5 | 0 | 0 | 0 | 0 | 0 | 0 | 6.9 | 0 | 19.0 |
| 29 | 18.8 | 0.6 | 0 | 0 | 0 | 0 | 0 | 0 | 6.0 | 0 | 22.7 |
| 30 | 18.5 | 0.5 | 0 | 0 | 0 | 0 | 0 | 0 | 4.2 | 0 | 31.0 |
| 31 | 18.5 | 23.1 | 0 | 0 | 0 | 0 | 0 | 0 | 1.9 | 0 | 36.9 |
| 32 | 18.5 | 44.2 | 0 | 0 | 0 | 0 | 0 | 0 | 1.9 | 0 | 36.9 |

| No. | $C_{17}$ | $C_{18}$ | $C_{19}$ | $C_{20}$ | $C_{21}$ | $C_{22}$ | $C_{23}$ | $C_{24}$ | Content of $C_{20}$–$C_{24}$ fatty acids (wt. %) |
|---|---|---|---|---|---|---|---|---|---|
| Invention products | | | | | | | | | |
| 26 | 0 | 19.5 | 0 | 17.8 | 0 | 23.9 | 0 | 0 | 41.7 |
| 27 | 0 | 27.6 | 0 | 20.2 | 0 | 19.1 | 0 | 1.6 | 40.9 |
| 28 | 0 | 23.0 | 0 | 22.7 | 0 | 27.5 | 0 | 0.9 | 51.1 |
| 29 | 0 | 23.8 | 0 | 20.8 | 0 | 26.7 | 0 | 0 | 47.5 |
| 30 | 0 | 23.6 | 0 | 19.0 | 0 | 21.5 | 0 | 0.8 | 41.3 |
| 31 | 0 | 19.5 | 0 | 17.8 | 0 | 23.9 | 0 | 0 | 41.7 |
| 32 | 0 | 19.5 | 0 | 17.8 | 0 | 23.9 | 0 | 0 | 41.7 |

TABLE 20

| Deinking agent No. | | Component (b) |
|---|---|---|
| Invention products | 26 | $C_{12}H_{25}O(EO)_{10}(PO)_5H$ |
| | 27 | $C_{18}H_{37}O(EO)_{70}(PO)_{30}H$ |
| | 28 | 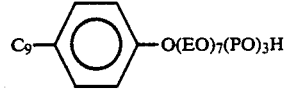 $C_9$—⟨ring⟩—$O(EO)_7(PO)_3H$ |
| | 29 | $C_{16}H_{33}O(PO)_{15}(EO)_{15}H$ |
| | 30 | $C_{18}H_{35}O(EO)_{22}(BO)_{10}H$ |
| | 31 | $C_{14}H_{29}O(EO)_{30}(PO)_{15}H$ |
| | 32 | $C_{14}H_{29}O(EO)_{30}(PO)_{15}H$ |

TABLE 21

| Deinking agent No. | Weight ratio (a)/(b) |
|---|---|
| Invention products | |
| 26 | 80/20 |
| 27 | 70/30 |
| 28 | 65/35 |
| 29 | 60/40 |
| 30 | 50/50 |
| 31 | 85/15 |
| 32 | 85/15 |

TABLE 22

| Deinking agent No. | Qualities of deinked pulp | | |
|---|---|---|---|
| | whiteness (%) | b value (%) | unliberated ink no. |
| Invention products | | | |
| 26 | 57.5 | 10.6 | 3 |
| 27 | 57.6 | 10.7 | 4 |
| 28 | 57.8 | 10.8 | 2 |
| 29 | 57.5 | 10.7 | 3 |
| 30 | 57.4 | 10.8 | 3 |
| 31 | 57.5 | 10.8 | 2 |
| 32 | 57.5 | 10.3 | 5 |

EXAMPLE 9

In this Example, a deinking agent was added in portions in the pulping stage and before the flotation stage.

Recovered waste newspapers were cut into pieces (2×5 cm) and a given amount thereof was fed into a bench disintegrator. Then water, 0.2% (based on the starting material) of caustic soda and 0.2% (based on the starting material) of each of the deinking agents listed in Tables 23 to 25 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 23%. Then 0.6% (based on the starting material) of caustic soda, 2.2% (based on the starting material) of sodium silicate No. 3 and 3.5% (based on the starting material) of 30% hydrogen peroxide were added thereto. After adjusting the pulp concentration to 22% with water, the slurry was mixed in the bench disintegrator for 1 minutes and then kneaded with a biaxial laboratory kneader 15 300 rpm. After diluting with water so as to give a pulp concentration of 4%, it was disintegrated again with the bench disintegrator for 30 seconds. Then 0.3% (based on the starting material) of each of the deinking agents listed in Tables 13 to 15 were added to the obtained pulp slurry. After diluting with water so as to give a pulp concentration of 1%, the slurry was subjected to flotation at 30° C. for 10 minutes. After the completion of the flotation, the pulp slurry was concentrated with a 60-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 40° dH with the use of $CaCl_2$ and $MgCl_2$ (Ca/Mg=8/2 mol).

The whiteness and b value of the pulp sheet thus obtained were measured with a color difference meter and the unliberated ink spots contained therein were counted with an image analyzer (100×magnification).

Table 23 shows the average carbon atom number of the component (a), the iodine value, the fatty acid composition and the content of fatty acids having 20 to 24 carbon atoms of each of the deinking agents. Table 24 shows the component (b) and Table 25 shows the weight ratio of the components (a) to (b). Further Table 26 shows the deinking performances.

In Table 23, all of the fatty acids of the component (a) contained in the deinking agents were in the form of sodium salts. Each of the components (a) No. 39 to No. 42 is prepared by blending individual sodium salts of the fatty acids with each other in such a manner as to give a composition of a specified carbon atom number.

TABLE 23

| No. | Average C atom No. | Iodine value (IV) | $C_8$ | $C_9$ | $C_{10}$ | $C_{11}$ | $C_{12}$ | $C_{13}$ | $C_{14}$ | $C_{15}$ | $C_{16}$ |
|---|---|---|---|---|---|---|---|---|---|---|---|
| Invention products | | | | | | | | | | | |
| 39 | 19.8 | 1.5 | 0 | 0 | 0 | 0 | 0 | 0 | 7.8 | 0 | 14.0 |
| 40 | 18.0 | 3.3 | 0 | 0 | 0 | 0 | 10.2 | 0 | 5.2 | 0 | 0 |
| 41 | 17.7 | 0.8 | 4.2 | 0 | 10.3 | 0 | 8.9 | 0 | 6.4 | 0 | 8.8 |
| 42 | 18.9 | 1.1 | 0 | 0 | 0 | 0 | 0 | 0 | 0 | 0 | 16.9 |

| No. | $C_{17}$ | $C_{18}$ | $C_{19}$ | $C_{20}$ | $C_{21}$ | $C_{22}$ | $C_{23}$ | $C_{24}$ | Content of $C_{20}$-$C_{24}$ fatty acids (wt. %) |
|---|---|---|---|---|---|---|---|---|---|
| Invention products | | | | | | | | | |
| 39 | 0 | 17.4 | 0 | 18.1 | 0 | 20.3 | 0 | 22.4 | 60.8 |
| 40 | 0 | 60.3 | 0 | 8.0 | 0 | 16.3 | 0 | 0 | 24.3 |
| 41 | 0 | 10.2 | 0 | 19.8 | 0 | 18.3 | 0 | 13.1 | 51.2 |
| 42 | 0 | 42.3 | 0 | 19.8 | 0 | 20.9 | 0 | 0.1 | 40.8 |

TABLE 24

| Deinking agent No. | | Component (b) |
|---|---|---|
| Invention products | 39 | $C_{12}H_{25}O(EO)_{10}(PO)_5H$ |
| | 40 | $C_{18}H_{37}O(EO)_{20}(PO)_{10}H$ |
| | 41 | $C_9H_{19}$—⟨phenyl⟩—$O(EO)_6(PO)_3H$ |
| | 42 | $C_{10}H_{21}O(EO)_{10}(BO)_5H$ |

TABLE 25

| Deinking agent No. | Weight ratio (a)/(b) |
|---|---|
| Invention products | |
| 39 | 90/10 |
| 40 | 80/20 |
| 41 | 70/30 |
| 42 | 60/40 |

TABLE 26

| Deinking agent No. | Qualities of deinked pulp | | |
|---|---|---|---|
| | whiteness (%) | b value (%) | unliberated ink no. |
| Invention products | | | |
| 39 | 57.8 | 10.7 | 2 |
| 40 | 57.6 | 10.8 | 4 |
| 41 | 57.6 | 10.8 | 2 |
| 42 | 57.7 | 10.8 | 3 |

EXAMPLE 10

In this Example, a deinking agent was added as a whole in the pulping stage.

Recovered waste newspapers were cut into pieces (2×5 cm) and a given amount thereof was fed into a bench disintegrator. Then water, 0.8% (based on the starting material) of caustic soda, 2.2% (based on the starting material) of sodium silicate No. 3, 3.5% (based on the starting material) of 30% hydrogen peroxide and 0.5% (based on the starting material) of each of the deinking agents listed in Tables 1 to 3 were added thereto. After disintegrating at a pulp concentration of 15% at 45° C. for 12 minutes, the mixture was aged at 55° C. for 120 minutes. Next, the mixture was dehydrated with a high-speed dehydrator until the pulp concentration reached 23% and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Table 27 shows the average carbon atom number of the component (a), the iodine value, the fatty acid composition and the content of fatty acids having 20 to 24 carbon atoms of each of the deinking agents. Table 28 shows the component (b) and Table 29 shows the weight ratio of the components (a) to (b). Further, Table 30 shows the deinking performances.

TABLE 27

| No. | Average C atom No. | Iodine value (IV) | Fatty acid carbon No. composition (wt. %) | | | | | | | | | |
|---|---|---|---|---|---|---|---|---|---|---|---|---|
| | | | $C_8$ | $C_9$ | $C_{10}$ | $C_{11}$ | $C_{12}$ | $C_{13}$ | $C_{14}$ | $C_{15}$ | $C_{16}$ |
| Invention products | | | | | | | | | | | | |
| 1 | 12.8 | 1.2 | 0.2 | 0.04 | 21.1 | 0.06 | 63.6 | 0.05 | 0.2 | 0.06 | 0.2 |
| 2 | 13.1 | 1.1 | 16.1 | 0.02 | 0.1 | 0.01 | 40.5 | 0.01 | 30.7 | 0 | 0.3 |
| 3 | 15.6 | 2.9 | 5.6 | 0.01 | 0.5 | 0.01 | 3.7 | 0.02 | 29.6 | 0.02 | 44.8 |
| 4 | 16.8 | 3.8 | 3.2 | 0 | 7.0 | 0 | 2.1 | 0 | 0.3 | 0 | 36.7 |
| 5 | 17.4 | 6.5 | 1.2 | 0 | 3.2 | 0 | 2.1 | 0 | 12.4 | 0 | 10.4 |
| 6 | 18.9 | 7.6 | 0.2 | 0 | 0.2 | 0 | 0.3 | 0 | 0.3 | 0 | 14.6 |
| 7 | 20.4 | 3.4 | 0 | 0 | 0 | 0 | 0.1 | 0 | 0.1 | 0 | 19.4 |
| 8 | 21.2 | 5.9 | 0 | 0 | 0 | 0 | 0 | 0 | 0.1 | 0 | 2.9 |
| 9 | 22.3 | 1.3 | 0 | 0 | 0 | 0 | 0 | 0 | 0 | 0 | 0 |

| No. | Fatty acid carbon No. composition (wt. %) | | | | | | | | Content of $C_{20}$-$C_{24}$ fatty acids (wt. %) |
|---|---|---|---|---|---|---|---|---|---|
| | $C_{17}$ | $C_{18}$ | $C_{19}$ | $C_{20}$ | $C_{21}$ | $C_{22}$ | $C_{23}$ | $C_{24}$ | |
| Invention products | | | | | | | | | |
| 1 | 0.04 | 3.8 | 0.05 | 4.5 | 0.05 | 5.9 | 0.05 | 0.1 | 9.6 |
| 2 | 0.01 | 0.4 | 0.05 | 4.7 | 0.05 | 6.9 | 0.05 | 0.1 | 11.8 |
| 3 | 0.01 | 0.6 | 0.03 | 5.1 | 0.05 | 9.8 | 0.05 | 0.1 | 12.8 |
| 4 | 0.06 | 34.1 | 0.04 | 5.6 | 0.05 | 10.7 | 0.05 | 0.1 | 16.5 |
| 5 | 0.04 | 52.8 | 0.06 | 5.8 | 0.05 | 11.4 | 0.05 | 0.5 | 17.8 |
| 6 | 0.05 | 47.0 | 0.05 | 15.4 | 0.05 | 18.1 | 0.05 | 3.7 | 37.3 |
| 7 | 0 | 17.6 | 0 | 17.9 | 0.1 | 21.2 | 0.1 | 23.5 | 62.8 |
| 8 | 0 | 32.9 | 0 | 4.2 | 0.1 | 20.6 | 0.1 | 39.1 | 64.1 |
| 9 | 0 | 18.4 | 11.6 | 0.2 | 0.1 | 0.2 | 0.1 | 69.4 | 70.0 |

TABLE 28

| Deinking agent No. | Component (b) |
|---|---|
| Invention products | |
| 1 | $C_{17}H_{35}COO(EO)_{18}(PO)_9H$ |
| 2 | $C_{11}H_{23}COO(EO)_{20}(BO)_7H$ |
| 3 | $C_{17}H_{33}COO(PO)_8(EO)_8H$ |
| 4 | $C_{17}H_{35}COO(EO)_{90}(PO)_{67}H$ |
| 5 | $C_{15}H_{31}COO(EO)_{50}H$ |
| 6 | $C_{17}H_{35}COO(EO)_{20}(PO)_{20}H$ |
| 7 | $C_{21}H_{43}COO(EO)_{30}(BO)_{10}H$ |
| 8 | $C_{17}H_{33}COO(PO)_{10}(EO)_{20}H$ |
| 9 | $C_{11}H_{23}COO(EO)_{60}H$ |

TABLE 29

| Deinking agent No. | Weight ratio (a)/(b) |
|---|---|
| Invention products | |
| 1 | 90/10 |
| 2 | 85/15 |
| 3 | 80/20 |
| 4 | 75/25 |
| 5 | 70/30 |
| 6 | 65/35 |
| 7 | 60/40 |
| 8 | 50/50 |
| 9 | 40/60 |

TABLE 30

| Deinking agent No. | Qualities of deinked pulp | | |
|---|---|---|---|
| | whiteness (%) | b value (%) | unliberated ink no. |
| Invention products | | | |
| 1 | 55.4 | 10.0 | 6 |
| 2 | 55.3 | 10.2 | 5 |
| 3 | 55.4 | 9.95 | 7 |
| 4 | 55.5 | 10.1 | 6 |
| 5 | 55.8 | 10.1 | 6 |
| 6 | 56.5 | 10.3 | 4 |
| 7 | 55.7 | 10.2 | 5 |
| 8 | 55.5 | 10.1 | 6 |
| 9 | 55.4 | 9.98 | 7 |

EXAMPLE 11

In this Example, a deinking agent was added in portions in the pulping and chemical mixing stages.

Recovered waste newspapers were cut into pieces (2×5 cm) and a given amount thereof was fed into a bench disintegrator. Then water, 0.2% (based on the starting material) of caustic soda and 0.1% (based on the starting material) of each of the deinking agents listed in Tables 31 to 33 were added thereto. After disintegrating at a pulp concentration of 15% at 45° C. for 12 minutes, the mixture was aged at 55° C for 120 minutes. Next, the mixture was dehydrated with a high-speed dehydrator until the concentration reached 23%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Tables 31 to 33 were added thereto. After adjusting the pulp concentration to 22% with water, the slurry was mixed in the bench disintegrator for 1 minute and then kneaded with a biaxial laboratory kneader 15 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.4% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Table 31 shows the average carbon atom number of the component (a), the iodine value, the fatty acid composition and the content of fatty acids having 20 to 24 carbon atoms of each of the deinking agents. Table 32 shows the component (b) and Table 33 shows the weight ratio of the components (a) to (b). Further, Table 34 shows the deinking performances.

TABLE 31

|  | No. | Average C atom No. | Iodine value (IV) | Fatty acid carbon No. composition (wt. %) | | | | | | | | | |
|---|---|---|---|---|---|---|---|---|---|---|---|---|---|
|  |  |  |  | $C_8$ | $C_9$ | $C_{10}$ | $C_{11}$ | $C_{12}$ | $C_{13}$ | $C_{14}$ | $C_{15}$ | $C_{16}$ | $C_{17}$ |
| Invention products | 19 | 12.8 | 1.8 | 0.2 | 0.04 | 21.1 | 0.06 | 63.6 | 0.05 | 0.2 | 0.06 | 0.2 | 0.04 |
|  | 20 | 15.6 | 40.5 | 5.6 | 0.01 | 0.5 | 0.01 | 3.7 | 0.02 | 29.6 | 0.02 | 44.8 | 0.01 |
|  | 21 | 16.8 | 0.9 | 3.2 | 0 | 7.0 | 0 | 2.1 | 0 | 0.3 | 0 | 36.7 | 0.06 |
|  | 22 | 18.9 | 18.3 | 0.2 | 0 | 0.2 | 0 | 0.3 | 0 | 0.3 | 0 | 14.6 | 0.05 |
|  | 23 | 20.4 | 27.6 | 0 | 0 | 0 | 0 | 0.1 | 0 | 0.1 | 0 | 19.4 | 0 |
|  | 24 | 22.3 | 8.2 | 0 | 0 | 0 | 0 | 0 | 0 | 0 | 0 | 0 | 0 |

|  | No. | Fatty acid carbon No. composition (wt. %) | | | | | | | Content of $C_{20}$–$C_{24}$ fatty acids (wt. %) |
|---|---|---|---|---|---|---|---|---|---|
|  |  | $C_{18}$ | $C_{19}$ | $C_{20}$ | $C_{21}$ | $C_{22}$ | $C_{23}$ | $C_{24}$ |  |
| Invention products | 19 | 3.5 | 0.05 | 4.5 | 0.05 | 6.2 | 0.05 | 0.1 | 10.9 |
|  | 20 | 0.6 | 0.03 | 5.1 | 0.05 | 9.8 | 0.05 | 0.1 | 12.8 |
|  | 21 | 34.1 | 0.04 | 5.6 | 0.05 | 10.7 | 0.05 | 0.1 | 16.5 |
|  | 22 | 47.0 | 0.05 | 15.4 | 0.05 | 18.1 | 0.05 | 3.7 | 37.3 |
|  | 23 | 17.6 | 0 | 17.9 | 0.1 | 21.2 | 0.1 | 23.5 | 62.8 |
|  | 24 | 18.4 | 11.6 | 0.2 | 0.1 | 0.2 | 0.1 | 69.4 | 70.0 |

TABLE 32

| Deinking agent No. |  | Component (b) |
|---|---|---|
| Invention products | 19 | $C_{11}H_{23}COO(EO)_{20}(PO)_{10}H$ |
|  | 20 | $C_{17}H_{35}COO(PO)_{10}(EO)_{10}H$ |
|  | 21 | $C_{15}H_{31}COO(EO)_{12}(BO)_{6}H$ |
|  | 22 | $C_{17}H_{33}COO(EO)_{50}H$ |
|  | 23 | $C_{21}H_{43}COO(EO)_{30}(BO)_{10}H$ |
|  | 24 | $C_{7}H_{15}COO(EO)_{70}(PO)_{40}H$ |

TABLE 33

| Deinking agent No. |  | Weight ratio (a)/(b) |
|---|---|---|
| Invention products | 19 | 90/10 |
|  | 20 | 80/20 |
|  | 21 | 70/30 |
|  | 22 | 60/40 |
|  | 23 | 50/50 |
|  | 24 | 40/60 |

TABLE 34

| Deinking agent No. |  | Qualities of deinked pulp | | |
|---|---|---|---|---|
|  |  | whiteness (%) | b value (%) | unliberated ink no. |
| Invention products | 19 | 55.9 | 10.1 | 5 |
|  | 20 | 56.4 | 10.3 | 4 |

TABLE 34-continued

| Deinking agent No. |  | Qualities of deinked pulp | | |
|---|---|---|---|---|
|  |  | whiteness (%) | b value (%) | unliberated ink no. |
|  | 21 | 55.5 | 9.96 | 6 |
|  | 22 | 55.8 | 10.1 | 5 |
|  | 23 | 55.7 | 10.0 | 5 |
|  | 24 | 55.7 | 10.21 | 4 |

EXAMPLE 12

In this Example, a deinking agent was added in portions in the pulping and kneading stages.

Recovered waste newspapers were cut into pieces (2×5 cm) and a given amount thereof was fed into a bench disintegrator. Then water, 0.2% (based on the starting material) of caustic soda and 0.3% (based on the starting material) of each of the deinking agents listed in Tables 35 to 37 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 23%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Tables 35 to 37 were added thereto. After adjusting the pulp concentration to 22% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 10° dH with the use of $CaCl_2$ and $MgCl_2$ (Ca/Mg=8/2 by mol).

The whiteness and b value of the pulp sheet thus obtained was measured with a color difference meter and the unliberated ink spots contained therein were counted with an image analyzer (100×magnification).

Table 35 shows the average carbon atom number of the component (a), the iodine value, the fatty acid composition and the content of fatty acids having 20 to 24 carbon atoms of each of the deinking agents. Table 36 shows the component (b) and Table 37 shows the weight ratio of the components (a) to (b). Further, Table 38 shows the deinking performances.

The components (a) listed in Table 35 were cod, sardine, saury and mackerel oil fatty acids (No. 30 to No. 33) and the one of No. 34 was a mixture of the components (a) of No. 30 and No. 31 at a weight ratio of 50/60. Those of No. 35 to No. 36 were prepared by varying the iodine value (IV) of the one of No. 30.

TABLE 35

|  | No. | Average C atom No. | Iodine value (IV) | $C_8$ | $C_9$ | $C_{10}$ | $C_{11}$ | $C_{12}$ | $C_{13}$ | $C_{14}$ | $C_{15}$ | $C_{16}$ |
|---|---|---|---|---|---|---|---|---|---|---|---|---|
| Invention products | 30 | 18.5 | 0.6 | 0 | 0 | 0 | 0 | 0 | 0 | 1.9 | 0 | 36.9 |
|  | 31 | 18.5 | 0.7 | 0 | 0 | 0 | 0 | 0 | 0 | 6.5 | 0 | 25.0 |
|  | 32 | 19.0 | 0.6 | 0 | 0 | 0 | 0 | 0 | 0 | 6.9 | 0 | 19.0 |
|  | 33 | 18.8 | 0.5 | 0 | 0 | 0 | 0 | 0 | 0 | 6.0 | 0 | 22.7 |
|  | 34 | 18.5 | 0.7 | 0 | 0 | 0 | 0 | 0 | 0 | 4.2 | 0 | 31.0 |
|  | 35 | 18.5 | 25.4 | 0 | 0 | 0 | 0 | 0 | 0 | 1.9 | 0 | 36.9 |
|  | 36 | 18.5 | 40.8 | 0 | 0 | 0 | 0 | 0 | 0 | 1.9 | 0 | 36.9 |

Fatty acid carbon No. composition (wt. %)

|  | No. | $C_{17}$ | $C_{18}$ | $C_{19}$ | $C_{20}$ | $C_{21}$ | $C_{22}$ | $C_{23}$ | $C_{24}$ | Content of $C_{20}$-$C_{24}$ fatty acids (wt. %) |
|---|---|---|---|---|---|---|---|---|---|---|
| Invention products | 30 | 0 | 19.5 | 0 | 17.8 | 0 | 23.9 | 0 | 0 | 41.7 |
|  | 31 | 0 | 27.6 | 0 | 20.2 | 0 | 19.1 | 0 | 1.6 | 40.9 |
|  | 32 | 0 | 23.0 | 0 | 22.7 | 0 | 27.5 | 0 | 0.9 | 51.1 |
|  | 33 | 0 | 23.8 | 0 | 20.8 | 0 | 26.7 | 0 | 0 | 47.5 |
|  | 34 | 0 | 23.6 | 0 | 19.0 | 0 | 21.5 | 0 | 0.8 | 41.3 |
|  | 35 | 0 | 19.5 | 0 | 17.8 | 0 | 23.9 | 0 | 0 | 41.7 |
|  | 36 | 0 | 19.5 | 0 | 17.8 | 0 | 23.9 | 0 | 0 | 41.7 |

TABLE 36

| Deinking agent No. |  | Component (b) |
|---|---|---|
| Invention products | 30 | $C_{17}H_{35}COO(EO)_{20}(PO)_{10}H$ |
|  | 31 | $C_{11}H_{23}COO(PO)_{12}(EO)_{12}H$ |
|  | 32 | $C_{17}H_{33}COO(EO)_{30}(BO)_{15}H$ |
|  | 33 | $C_{15}H_{31}COO(EO)_{60}H$ |
|  | 34 | $C_{21}H_{43}COO(EO)_{10}(PO)_{10}H$ |
|  | 35 | $C_{17}H_{35}COO(EO)_{20}(PO)_{10}H$ |
|  | 36 | $C_{17}H_{35}COO(EO)_{20}(PO)_{10}H$ |

TABLE 37

| Deinking agent No. |  | Weight ratio (a)/(b) |
|---|---|---|
| Invention products | 30 | 30/20 |
|  | 31 | 70/30 |
|  | 32 | 60/40 |
|  | 33 | 50/50 |
|  | 34 | 40/60 |
|  | 35 | 80/20 |
|  | 36 | 80/20 |

TABLE 38

| Deinking agent No. |  | Qualities of deinked pulp | | |
|---|---|---|---|---|
|  |  | whiteness (%) | b value (%) | unliberated ink no. |
| Invention products | 30 | 57.6 | 10.8 | 2 |
|  | 31 | 57.5 | 10.6 | 3 |
|  | 32 | 57.6 | 10.5 | 3 |
|  | 33 | 57.5 | 10.2 | 4 |
|  | 34 | 57.7 | 10.8 | 2 |
|  | 35 | 57.6 | 10.5 | 3 |
|  | 36 | 57.5 | 10.1 | 4 |

EXAMPLE 13

In this Example, a deinking agent was added in portions in the pulping stage and before the flotation stage.

Recovered waste newspapers were cut into pieces (2×5 cm) and a given amount thereof was fed into a bench disintegrator. Then water, 0.2% (based on the starting material) of caustic soda and 0.2% (based on the starting material) of each of the deinking agents listed in Tables 39 to 41 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 23%. Then 0.6% (based on the starting material) of caustic soda, 2.2% (based on the starting material) of sodium silicate and 3.5% (based on the starting material) of 30% hydrogen peroxide were added thereto. After adjusting the pulp concentration to 22% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. Then 0.3% (based on the starting material) of each of the deinking agents listed in Tables 39 to 41 was added to the obtained pulp slurry. After diluting with water so as to give a pulp concentration of 1%, the slurry was subjected to flotation at 30° C. for 10 minutes. After the completion of the flotation, the pulp slurry was concentrated with a 60mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 40. dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Table 39 shows the average carbon atom number of the component (a), the iodine value, the fatty acid composition and the content of fatty acids having 20 to 24 carbon atoms of each of the deinking agents. Table 40 shows the component (b) and Table 41 shows the weight ratio of the components (a) to (b). Further Table 42 shows the deinking performances.

In Table 39, all of the fatty acids contained in the components (a) of the deinking agents were in the form of sodium salts. Each of the deinking agents No. 43 to No. 46 is prepared by blending individual sodium salts of the fatty acids with each other in such a manner as to give a composition of a specified carbon atom number.

TABLE 39

| | No. | Average C atom No. | Iodine value (IV) | $C_8$ | $C_9$ | $C_{10}$ | $C_{11}$ | $C_{12}$ | $C_{13}$ | $C_{14}$ | $C_{15}$ | $C_{16}$ |
|---|---|---|---|---|---|---|---|---|---|---|---|---|
| Invention products | 43 | 19.8 | 1.5 | 0 | 0 | 0 | 0 | 0 | 0 | 7.8 | 0 | 14.0 |
| | 44 | 18.0 | 3.3 | 0 | 0 | 0 | 0 | 10.2 | 0 | 5.2 | 0 | 0 |
| | 45 | 17.7 | 0.9 | 4.2 | 0 | 10.3 | 0 | 8.9 | 0 | 6.4 | 0 | 8.8 |
| | 46 | 18.9 | 2.6 | 0 | 0 | 0 | 0 | 0 | 0 | 0 | 0 | 16.9 |

| | No. | $C_{17}$ | $C_{18}$ | $C_{19}$ | $C_{20}$ | $C_{21}$ | $C_{22}$ | $C_{23}$ | $C_{24}$ | Content of $C_{20}$-$C_{24}$ fatty acids (wt. %) |
|---|---|---|---|---|---|---|---|---|---|---|
| Invention products | 43 | 0 | 17.4 | 0 | 18.1 | 0 | 20.3 | 0 | 22.4 | 60.8 |
| | 44 | 0 | 60.3 | 0 | 8.0 | 0 | 16.3 | 0 | 0 | 24.3 |
| | 45 | 0 | 10.2 | 0 | 19.8 | 0 | 18.3 | 0 | 13.1 | 51.2 |
| | 46 | 0 | 42.3 | 0 | 19.8 | 0 | 20.9 | 0 | 0.1 | 40.8 |

TABLE 40

| Deinking agent No. | | Component (b) |
|---|---|---|
| Invention products | 43 | $C_{11}H_{23}COO(EO)_{10}(PO)_8H$ |
| | 44 | $C_{17}H_{35}COO(EO)_{18}(PO)_9H$ |
| | 45 | $C_{15}H_{31}COO(EO)_{10}(BO)_5H$ |
| | 46 | $C_{17}H_{33}COO(PO)_{20}(EO)_{20}H$ |

TABLE 41

| Deinking agent No. | | Weight ratio (a)/(b) |
|---|---|---|
| Invention products | 43 | 90/10 |
| | 44 | 80/20 |
| | 45 | 70/30 |
| | 46 | 60/40 |

TABLE 42

| Deinking agent No. | | Qualities of deinked pulp | | |
|---|---|---|---|---|
| | | whiteness (%) | b value (%) | unliberated ink no. |
| Invention products | 43 | 57.5 | 10.8 | 2 |
| | 44 | 57.6 | 10.8 | 2 |
| | 45 | 57.3 | 10.5 | 3 |
| | 46 | 57.2 | 10.5 | 3 |

TABLE 43

| No. | Average C atom No. | Iodine value (IV) | $C_8$ | $C_9$ | $C_{10}$ | $C_{11}$ | $C_{12}$ | $C_{13}$ | $C_{14}$ | $C_{15}$ | $C_{16}$ |
|---|---|---|---|---|---|---|---|---|---|---|---|
| A | 12.8 | 0.7 | 0.2 | 0.04 | 21.1 | 0.06 | 63.6 | 0.05 | 0.2 | 0.06 | 0.2 |
| B | 13.1 | 2.8 | 16.1 | 0.02 | 0.1 | 0.01 | 40.5 | 0.01 | 30.7 | 0 | 0.3 |
| C | 14.5 | 0.9 | 9.7 | 0.02 | 2.3 | 0.01 | 10.5 | 0.02 | 41.5 | 0.02 | 22.9 |
| D | 15.6 | 1.7 | 5.6 | 0.01 | 0.5 | 0.01 | 3.7 | 0.02 | 29.6 | 0.02 | 44.8 |
| E | 16.8 | 2.1 | 3.2 | 0 | 7.0 | 0 | 2.1 | 0 | 0.3 | 0 | 36.7 |
| F | 17.4 | 3.5 | 1.2 | 0 | 3.2 | 0 | 2.1 | 0 | 12.4 | 0 | 10.4 |
| G | 18.2 | 1.9 | 3.8 | 0 | 0 | 0 | 0.1 | 0 | 0.1 | 0 | 0.1 |
| H | 18.9 | 5.4 | 0.2 | 0 | 0.2 | 0 | 0.3 | 0 | 0.3 | 0 | 14.6 |
| I | 19.3 | 4.7 | 0.1 | 0 | 0.1 | 0 | 0.2 | 0 | 0.2 | 0 | 36.1 |
| J | 20.4 | 1.8 | 0 | 0 | 0 | 0 | 0.1 | 0 | 0.1 | 0 | 19.4 |
| K | 21.2 | 7.6 | 0 | 0 | 0 | 0 | 0 | 0 | 0.1 | 0 | 2.9 |
| L | 22.3 | 6.2 | 0 | 0 | 0 | 0 | 0 | 0 | 0 | 0 | 0 |
| M | 12.8 | 1.7 | 0.2 | 0.04 | 21.1 | 0.06 | 63.6 | 0.05 | 0.2 | 0.06 | 0.2 |

| No. | $C_{17}$ | $C_{18}$ | $C_{19}$ | $C_{20}$ | $C_{21}$ | $C_{22}$ | $C_{23}$ | $C_{24}$ | Content of $C_{20}$-$C_{24}$ fatty acids (wt. %) |
|---|---|---|---|---|---|---|---|---|---|
| A | 0.04 | 3.8 | 0.05 | 4.5 | 0.05 | 5.9 | 0.05 | 0.1 | 9.6 |
| B | 0.01 | 0.4 | 0.05 | 4.7 | 0.05 | 6.9 | 0.05 | 0.1 | 11.8 |
| C | 0.01 | 0.5 | 0.02 | 4.8 | 0.05 | 7.5 | 0.05 | 0.1 | 12.5 |
| D | 0.01 | 0.6 | 0.03 | 5.1 | 0.05 | 9.8 | 0.05 | 0.1 | 12.8 |
| E | 0.06 | 34.1 | 0.04 | 5.6 | 0.05 | 10.7 | 0.05 | 0.1 | 16.5 |

TABLE 43-continued

| | | | | | | | | | |
|---|---|---|---|---|---|---|---|---|---|
| F | 0.04 | 52.8 | 0.06 | 5.8 | 0.05 | 11.4 | 0.05 | 0.5 | 17.8 |
| G | 0.07 | 74.5 | 0.03 | 5.3 | 0.05 | 13.4 | 0.05 | 1.1 | 30.5 |
| H | 0.05 | 47.0 | 0.05 | 15.4 | 0.05 | 18.1 | 0.05 | 3.7 | 37.3 |
| I | 0 | 9.2 | 0.1 | 16.5 | 0.1 | 26.9 | 0.1 | 10.4 | 54.0 |
| J | 0 | 17.6 | 0 | 17.9 | 0.1 | 21.2 | 0.1 | 23.5 | 62.8 |
| K | 0 | 32.9 | 0 | 4.2 | 0.1 | 20.6 | 0.1 | 39.1 | 64.1 |
| L | 0 | 18.4 | 11.6 | 0.2 | 0.1 | 0.2 | 0.1 | 69.4 | 70.7 |
| M | 0.04 | 3.5 | 0.05 | 4.5 | 0.05 | 6.2 | 0.05 | 0.1 | 10.9 |

| No. | Average C atom No. | Iodine value (IV) | Fatty acid carbon No. composition (wt. %) | | | | | | | | | |
|---|---|---|---|---|---|---|---|---|---|---|---|---|
| | | | $C_8$ | $C_9$ | $C_{10}$ | $C_{11}$ | $C_{12}$ | $C_{13}$ | $C_{14}$ | $C_{15}$ | $C_{16}$ | |
| N | 14.5 | 7.3 | 9.7 | 0.02 | 2.3 | 0.01 | 10.5 | 0.02 | 41.5 | 0.02 | 22.9 | |
| O | 15.6 | 18.9 | 5.6 | 0.01 | 0.5 | 0.01 | 3.7 | 0.02 | 29.6 | 0.02 | 44.8 | |
| P | 16.8 | 26.6 | 3.2 | 0 | 7.0 | 0 | 2.1 | 0 | 0.3 | 0 | 36.7 | |
| Q | 18.9 | 44.8 | 0.2 | 0 | 0.2 | 0 | 0.3 | 0 | 0.3 | 0 | 14.6 | |
| R | 20.4 | 31.5 | 0 | 0 | 0 | 0 | 0.1 | 0 | 0.1 | 0 | 19.4 | |
| S | 22.3 | 5.2 | 0 | 0 | 0 | 0 | 0 | 0 | 0 | 0 | 0 | |
| T | 18.5 | 0.3 | 0 | 0 | 0 | 0 | 0 | 0 | 1.9 | 0 | 36.9 | |
| U | 18.5 | 0.3 | 0 | 0 | 0 | 0 | 0 | 0 | 6.5 | 0 | 25.0 | |
| V | 19.0 | 0.3 | 0 | 0 | 0 | 0 | 0 | 0 | 6.9 | 0 | 19.0 | |
| W | 18.8 | 0.3 | 0 | 0 | 0 | 0 | 0 | 0 | 6.0 | 0 | 22.7 | |
| X | 18.5 | 0.3 | 0 | 0 | 0 | 0 | 0 | 0 | 4.2 | 0 | 31.0 | |
| Y | 18.5 | 23.5 | 0 | 0 | 0 | 0 | 0 | 0 | 1.9 | 0 | 36.9 | |
| Z | 18.5 | 44.8 | 0 | 0 | 0 | 0 | 0 | 0 | 1.9 | 0 | 36.9 | |

| No. | Fatty acid carbon No. composition (wt. %) | | | | | | | | Content of $C_{20}$-$C_{24}$ fatty acids (wt. %) |
|---|---|---|---|---|---|---|---|---|---|
| | $C_{17}$ | $C_{18}$ | $C_{19}$ | $C_{20}$ | $C_{21}$ | $C_{22}$ | $C_{23}$ | $C_{24}$ | |
| N | 0.01 | 0.5 | 0.02 | 4.8 | 0.05 | 7.5 | 0.05 | 0.1 | 12.5 |
| O | 0.01 | 0.6 | 0.03 | 5.1 | 0.05 | 9.8 | 0.05 | 0.1 | 12.8 |
| P | 0.06 | 34.1 | 0.04 | 5.6 | 0.05 | 10.7 | 0.05 | 0.1 | 16.5 |
| Q | 0.05 | 47.0 | 0.05 | 15.4 | 0.05 | 18.1 | 0.05 | 3.7 | 37.3 |
| R | 0 | 17.6 | 0 | 17.9 | 0.1 | 21.2 | 0.1 | 23.5 | 62.8 |
| S | 0 | 18.4 | 11.6 | 0.2 | 0.1 | 0.2 | 0.1 | 69.4 | 70.0 |
| T | 0 | 19.5 | 0 | 17.8 | 0 | 23.9 | 0 | 0 | 41.7 |
| U | 0 | 27.6 | 0 | 20.2 | 0 | 19.1 | 0 | 1.6 | 40.9 |
| V | 0 | 23.0 | 0 | 22.7 | 0 | 27.5 | 0 | 0.9 | 51.1 |
| W | 0 | 23.8 | 0 | 20.8 | 0 | 26.7 | 0 | 0 | 47.5 |
| X | 0 | 23.6 | 0 | 19.0 | 0 | 21.5 | 0 | 0 | 41.3 |
| Y | 0 | 19.5 | 0 | 17.8 | 0 | 23.9 | 0 | 0 | 41.7 |
| Z | 0 | 19.5 | 0 | 17.8 | 0 | 23.9 | 0 | 0 | 41.7 |

EXAMPLE 14

In this Example, a deinking agent was added as a whole in the pulping stage.

Recovered waste newspapers were cut into pieces 2×5 cm) and a given amount thereof was fed into a bench disintegrator. Then water, 0.8% (based on the starting material) of caustic soda, 2.2% (based on the starting material) of sodium silicate No. 3, 3.5% (based on the starting material) of 30% hydrogen peroxide and 0.5% (based on the starting material) of each of the deinking agents listed in Tables 43 and 44 were added thereto. After disintegrating at a pulp concentration of 15% at 45° C. for 12 minutes, the mixture was aged at 55° C. for 120 minutes. Next, the mixture was dehydrated with a high-speed dehydrator until the pulp concentration reached 23% and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5 dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Further, the foam volume at the flotation was measured as an indicator of the operation stability in the flotation stage. A foam volume ranging from 200 to 350 ml indicates a good stability. When the foam volume is outside the above range, foaming troubles might occur.

Table 44 shows the component (a), the composition of the component (b) and the weight ratio of the components (a) to (b) of each of the deinking agents used in the test s well as the deinking performance thereof.

TABLE 44

| Deinking agent No. | | component (a) fatty acid mixture | component (b): RO(AO)$_n$SO$_3$M | | | | (a)/(b) (wt. ratio) | Whiteness (%) | b value (%) | Unliberated ink No. | Foam vol. (ml) |
|---|---|---|---|---|---|---|---|---|---|---|---|
| | | | starting alcohol | AO | n | M | | | | | |
| Invention products | 1 | A | 1-octanol | EO/PO(1/1) | 2.0 | Na | 70/30 | 55.8 | 9.98 | 5 | 310 |
| | 2 | B | 1-octanol | EO | 2.0 | Na | 78/22 | 55.1 | 9.96 | 5 | 305 |

TABLE 44-continued

| Deinking agent No. | component (a) fatty acid mixture | component (b): RO(AO)$_n$SO$_3$M | | | | (a)/(b) (wt. ratio) | White-ness (%) | b value (%) | Unliberated ink No. | Foam vol. (ml) |
|---|---|---|---|---|---|---|---|---|---|---|
| | | starting alcohol | AO | n | M | | | | | |
| 3 | C | 1-octanol | PO | 2.0 | Na | 88/12 | 55.7 | 10.0 | 5 | 300 |
| 4 | D | 1-octanol | EO/BO(1/1) | 4.5 | Na | 76/24 | 55.5 | 9.98 | 4 | 305 |
| 5 | E | 2-octanol | EO | 1.0 | Na | 74/26 | 55.9 | 9.95 | 4 | 305 |
| 6 | F | 2-octanol | EO | 5.0 | Na | 86/14 | 55.4 | 10.1 | 6 | 305 |
| 7 | G | oleyl alcohol | EO | 3.0 | K | 90/10 | 55.9 | 10.4 | 6 | 280 |
| 8 | H | cyclononanol | EO | 2.0 | K | 85/15 | 56.4 | 10.6 | 3 | 300 |
| 9 | I | 2-octen-1-ol | EO | 2.4 | NH$_4$ | 85/15 | 55.8 | 10.2 | 6 | 300 |
| 10 | J | linolenyl alcohol | EO/PO(2/1) | 3.0 | NH$_4$ | 82/18 | 55.9 | 10.2 | 6 | 295 |
| 11 | K | elaidyl alcohol | EO | 1.2 | NH$_4$ | 92/8 | 55.2 | 9.99 | 7 | 270 |
| 12 | L | eleostearyl alcohol | EO | 3.5 | NH$_4$ | 90/10 | 56.1 | 10.2 | 7 | 280 |

Note: Alkylene oxides were all added at random. The values given in the parentheses are molar ratios.

EXAMPLE 15

In this Example, a deinking agent was added in portions in the pulping and chemical mixing stages.

Recovered waste newspapers were cut into pieces (2×5 cm) and a given amount thereof was fed into a bench disintegrator. Then water, 0.2% (based on the starting material) of caustic soda and 0.1% (based on the starting material) of each of the deinking agents listed in Tables 43 and 45 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 23%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Table 45 were added thereto. After adjusting the pulp concentration to 22% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.4% (based on the starting material) of CaCl$_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of CaCl$_2$ and MgCl$_2$ (Ca/Mg=8/2 by mol).

The whiteness and b value of the pulp sheet thus obtained were measured with a color difference meter and the unliberated ink spots contained therein were counted with an image analyzer (100×magnification). Further, the foam volume in the flotation stage was measured similar to Example 14.

Table 45 shows the component (a), the composition of the component (b) and the weight ratio of the components (a) to (b) of each of the deinking agents used in the test as well as the deinking performance thereof.

TABLE 45

| Deinking agent No. Invention products | component (a) fatty acid mixture | component (b): RO(AO)$_n$SO$_3$M | | | | (a)/(b) (wt. ratio) | Whiteness (%) | b value (%) | Unhliberated ink No. | Foam vol. (ml) |
|---|---|---|---|---|---|---|---|---|---|---|
| | | starting alcohol | AO | n | M | | | | | |
| 42 | M | 2-pentadecanol | EO | 2.1 | Na | 88/12 | 55.4 | 10.3 | 5 | 300 |
| 43 | N | 2-hexadecanol | EO | 1.8 | K | 90/10 | 55.3 | 10.2 | 4 | 295 |
| 44 | O | 2-nonadecanol | EO | 1.2 | K | 82/18 | 55.3 | 10.1 | 3 | 310 |
| 45 | P | 2-tetracosanol | EO/PO(3/1) | 1.2 | K | 80/20 | 55.6 | 10.2 | 4 | 320 |
| 46 | Q | 11-dodecen-1-ol | EO/PO(5/1) | 2.9 | K | 74/26 | 55.5 | 10.2 | 5 | 320 |
| 47 | R | linoleyl alcohol | EO/PO(2/1) | 4.2 | K | 72/28 | 55.4 | 10.2 | 6 | 320 |
| 48 | S | octyl phenol | EO/BO(1/1) | 4.6 | NH$_4$ | 73/27 | 55.3 | 10.1 | 4 | 310 |

Note: Alkylene oxides were all added at random. The values given in the parentheses are molar ratios.

In this Example, a deinking agent was added in portions in the pulping and kneading stages.

Recovered waste newspapers were cut into pieces (2×5 cm) and a given amount thereof was fed into a bench disintegrator. Then water, 0.2% (based on the starting material) of caustic soda and 0.3% (based on the starting material) of each of the deinking agents listed in Table 46 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 22%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Table 46 were added thereto. After adjusting the pulp concentration to 23% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of CaCl$_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 10 dH with the use of $CaCl_2$ and $MgCl_2$ (Ca/Mg=8/2 by mol).

The whiteness and b value of the pulp sheet thus obtained was measured with a color difference meter and the unliberated ink spots contained therein were counted with an image analyzer (100×magnification). Further, the foam volume was measured in the flotation stage similar to Example 14.

Table 46 shows the component (a), the composition of the component (b) and the weight ratio of the components (a) to (b) of each of the tested deinking agents and the deinking performances thereof.

The components (a) listed in Table 9 were cod, sardine, saury and mackerel oil fatty acids (No. 75–No. 78; T, U, V and W) and the one of No. 79 (X) was a mixture of the components (a) of No. 75 (T) and No. 76 (U) at a weight ratio of 50/50. That of No. 80 was prepared by varying the iodine value (IV) of the one of No. 75 (T).

ing the pulp concentration to 22% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.4% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Table 49 shows the deinking performances achieved by various deinking methods. Each of the highly fatty acid mixtures α to δ listed in Table 48 is prepared by blending individual fatty acids with each other in such a manner as to give a composition of a specified carbon atom number.

TABLE 46

| Deinking agent No. Invention products | component (a) fatty acid mixture | component (b): $RO(AO)_nSO_3M$ | | | | (a)/(b) (wt. ratio) | Whiteness (%) | b value (%) | Unhliberated ink No. | Foam vol. (ml) |
|---|---|---|---|---|---|---|---|---|---|---|
| | | starting alcohol | AO | n | M | | | | | |
| 74 | T | nonylphenol | EO/PO(1/1) | 1.2 | Na | 81/19 | 56.4 | 10.3 | 1 | 305 |
| 75 | U | 1-heneicosanol | EO | 2.4 | Na | 72/28 | 56.3 | 10.6 | 1 | 310 |
| 76 | V | 2-tricosanol | EO | 4.3 | Na | 83/17 | 56.8 | 10.5 | 0 | 305 |
| 77 | W | 2-tetracosanol | EO | 3.2 | Na | 75/25 | 56.4 | 10.7 | 1 | 310 |
| 78 | X | 2-octen-1-ol | EO | 1.0 | Na | 88/12 | 56.7 | 10.6 | 1 | 285 |
| 79 | Y | 12-tridecen-1-ol | EO | 2.5 | K | 87/13 | 56.5 | 10.6 | 1 | 290 |
| 80 | Z | elaidyl alcohol | EO/PO(2.5/1) | 2.6 | K | 82/18 | 56.6 | 10.6 | 0 | 280 |

Note: Alkylene oxides were all added at random. The values given in the parentheses are molar ratios.

EXAMPLE 17

In this Example, a deinking agent was added in portions in the pulping and chemical mixing stages.

Recovered waste newspapers were cut into pieces (2×5 cm) and a given amount thereof was fed into a bench disintegrator. Then water, 0.2% (based on the starting material) of caustic soda and a given amount of each of the deinking agents listed in Tables 47 and/or 48 were added thereto. After disintegrating at a pulp concentration of 15% at 45° C for 12 minutes, the mixture was aged at 55° C. for 120 minutes. Next, the mixture was dehydrated with a high-speed dehydrator until the concentration reached 23%. Then 0.6% (based on the starting material) of caustic soda, 2.2% (based on the starting material) of sodium silicate No. 3, 3.5% (based on the starting material) of 30% hydrogen peroxide and a given amount of each of the deinking agents listed in Tables 47 and/or 48 were added thereto. After adjust-

TABLE 47

| No. | Surfactant: (a-1) to (a-4) | Mode of AO addition |
|---|---|---|
| 1 | (a-1) $C_{18}H_{33}O(PO)_{10}(EO)_{10}H$ | block |
| 2 | (a-1) $C_{16}H_{33}O(PO)_{12}(EO)_6H$ | block |
| 3 | (a-2) $C_{11}H_{23}COO(EO)_{20}(PO)_{10}H$ | block |
| 4 | (a-3) $CH_2=CH(CH_2)_{10}O(EO)_{2.4}(PO)_{0.5}SO_3K$ | random |
| 5 | (a-4) hardened palm oil (IV = 1.2)/ diglycerol mixture (1/2.6 by mol) $(PO)_{37.2}$ | random |

In the above table, AO means an alkylene oxide and the same will apply hereinafter.

TABLE 48

| | Higher fatty acid mixture: component (b) | | | | | | | | | |
|---|---|---|---|---|---|---|---|---|---|---|
| No. | Average C atom No. | Iodine value (IV) | Fatty acid carbon No. composition (wt. %) | | | | | | | |
| | | | $C_8$ | $C_9$ | $C_{10}$ | $C_{11}$ | $C_{12}$ | $C_{13}$ | $C_{14}$ | $C_{15}$ | $C_{16}$ |
| α | 18.9 | 44.8 | 0.2 | 0 | 0.2 | 0 | 0.3 | 0 | 0.3 | 0 | 14.6 |
| β | 20.4 | 31.5 | 0 | 0 | 0 | 0 | 0.1 | 0 | 0.1 | 0 | 19.4 |
| γ | 12.8 | 1.7 | 0.2 | 0.04 | 21.1 | 0.06 | 63.6 | 0.05 | 0.2 | 0.06 | 0.2 |
| δ | 22.3 | 5.2 | 0 | 0 | 0 | 0 | 0 | 0 | 0 | 0 | 0 |

| Higher fatty acid mixture: component (b) | |
|---|---|
| Fatty acid carbon No. composition (wt. %) | Content of $C_{20}$-$C_{24}$ fatty acids |

TABLE 48-continued

| No. | $C_{17}$ | $C_{18}$ | $C_{19}$ | $C_{20}$ | $C_{21}$ | $C_{22}$ | $C_{23}$ | $C_{24}$ | (wt. %) |
|---|---|---|---|---|---|---|---|---|---|
| α | 0.05 | 47.0 | 0.05 | 15.4 | 0.05 | 18.1 | 0.05 | 3.7 | 37.3 |
| β | 0 | 17.6 | 0 | 17.9 | 0.1 | 21.2 | 0.1 | 23.5 | 62.8 |
| γ | 0.04 | 3.5 | 0.05 | 4.5 | 0.05 | 6.2 | 0.05 | 0.1 | 10.9 |
| δ | 0 | 18.4 | 11.6 | 0.2 | 0.1 | 0.2 | 0.1 | 69.4 | 70.0 |

TABLE 49

| | Stage and amount of addition of deinking agent | | | | | |
|---|---|---|---|---|---|---|
| | deinking agent (wt. % based on starting material) | | deinking agent | | | |
| Ex. No. | pulping stage (I) | chemical mixing stage (II) | (a)/(b) (wt. ratio) | Whiteness (%) | b value (%) | Unliberated ink No. |
| 1 | 1 (0.2) | α (0.2) | 50/50 | 56.1 | 10.6 | 3 |
| 2 | α (0.2) | 1 (0.2) | 50/50 | 54.1 | 9.06 | 8 |
| 3 | 2 (0.1) | β (0.2) | 33/67 | 56.0 | 10.7 | 3 |
| 4 | 2 (0.045) β (0.055) | 2 (0.09) β (0.11) | 45/55 | 55.7 | 10.4 | 6 |
| 5 | 3 (0.1) | γ (0.2) | 33/67 | 56.1 | 10.7 | 3 |
| 6 | γ (0.2) | 3 (0.1) | 33/67 | 54.2 | 9.05 | 9 |
| 7 | 3 (0.01) γ (0.09) | 3 (0.02) γ (0.18) | 10/90 | 55.9 | 10.1 | 5 |
| 8 | 4 (0.126) | α (0.324) | 28/72 | 56.4 | 10.9 | 2 |
| 9 | 4 (0.056) α (0.144) | 4 (0.07) α (0.18) | 28/72 | 55.5 | 10.2 | 5 |
| 10 | 5 (0.1) | δ (0.2) | 33/67 | 56.3 | 10.9 | 3 |
| 11 | δ (0.1) | 5 (0.2) | 67/33 | 54.1 | 9.05 | 9 |
| 12 | 5 (0.027) δ (0.073) | 5 (0.054) δ (0.146) | 27/73 | 56.3 | 10.3 | 4 |

EXAMPLE 18

In this Example, a deinking agent was added in portions in the pulping and kneading stages.

Recovered waste newspapers were cut into pieces (2×5 cm) and a given amount thereof was fed into a bench disintegrator. Then water, 0.2% (based on the starting material) of caustic soda and a given amount of each of the deinking agents listed in Tables 50 and/or 51 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 23%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Tables 50 and/or 51 were added thereto. After adjusting the pulp concentration to 22% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of CaCl$_2$ was added thereto. After the completion of the flotation, the pulp slurry was concentrated with an 80-mesh sire to thereby give a concentration of 4%. Then it was diluted with water so as to give a pulp concentration of 1% and treated with a TAPPI standard sheet machine to thereby give a pulp sheet.

The hardness of the employed water was adjusted to 10. dH with the use of CaCl$_2$ and MgCl$_2$ (Ca/Mg=8/2 by mol).

The whiteness and b value of the pulp sheet thus obtained were measured with a color difference meter and the unliberated ink spots contained therein were counted with an image analyzer (100×magnification).

Table 52 shows the deinking performances achieved by various deinking methods. The higher fatty acids contained in the deinking agents listed in Table 51 were hardened fatty acids of sardine, saury and mackerel oils (Nos. ε to η) and stearic acid and sardine oil fatty acids (IV=175) (Nos. θ to ι).

TABLE 50

| No. | Surfactant: (a-1) to (a-4) | Mode of AO addition |
|---|---|---|
| 6 | (a-1) $C_{18}H_{37}O(EO)_{70}(PO)_{30}H$ | random |
| 7 | (a-2) $C_{17}H_{33}COO(EO)_{30}(BO)_{15}H$ | random |
| 8 | (a-3) $C_{22}H_{45}(CH_3)CHO(EO)_{3.2}SO_3Na$ | — |
| 9 | (a-4) hardened fish oil (IV = 0.8)/ethylene glycol mixture (1/1.6 by mol) $(EO)_{39.9}(PO)_{13.3}$ | block |
| 10 | (a-4) hardened beef tallow (IV = 2.0)/ glycerol mixture (1/0.6 by mol) $(EO)_{52}(PO)_{29}$ | block |

TABLE 51

| | Higher fatty acid mixture: component (b) | | | | | | | | | |
|---|---|---|---|---|---|---|---|---|---|---|
| | Average C atom No. | Iodine value (IV) | Fatty acid carbon No. composition (wt. %) | | | | | | | |
| No. | | | $C_8$ | $C_9$ | $C_{10}$ | $C_{11}$ | $C_{12}$ | $C_{13}$ | $C_{14}$ | $C_{15}$ | $C_{16}$ |
| ε | 18.5 | 0.3 | 0 | 0 | 0 | 0 | 0 | 0 | 6.5 | 0 | 25.0 |
| ζ | 19.0 | 0.3 | 0 | 0 | 0 | 0 | 0 | 0 | 6.9 | 0 | 19.0 |
| η | 18.8 | 0.3 | 0 | 0 | 0 | 0 | 0 | 0 | 6.0 | 0 | 22.7 |
| θ | 18.0 | 0.3 | 0 | 0 | 0 | 0 | 0 | 0 | 0 | 0 | 0 |

TABLE 51-continued

| | | | | | | | | | | |
|---|---|---|---|---|---|---|---|---|---|---|
| ι | 18.5 | 175.0 | 0 | 0 | 0 | 0 | 0 | 0 | 6.5 | 0 | 25.0 |

| | Higher fatty acid mixture: component (b) | | | | | | | | |
|---|---|---|---|---|---|---|---|---|---|
| | Fatty acid carbon No. composition (wt. %) | | | | | | | | Content of $C_{20}$–$C_{24}$ fatty acids |
| No. | $C_{17}$ | $C_{18}$ | $C_{19}$ | $C_{20}$ | $C_{21}$ | $C_{22}$ | $C_{23}$ | $C_{24}$ | (wt. %) |
| ε | 0 | 27.6 | 0 | 20.2 | 0 | 19.1 | 0 | 1.6 | 40.9 |
| ζ | 0 | 23.0 | 0 | 22.7 | 0 | 27.5 | 0 | 0.9 | 51.1 |
| η | 0 | 23.8 | 0 | 20.8 | 0 | 26.7 | 0 | 0 | 47.5 |
| θ | 0 | 100 | 0 | 0 | 0 | 0 | 0 | 0 | 0 |
| ι | 0 | 27.6 | 0 | 20.2 | 0 | 19.1 | 0 | 1.6 | 40.9 |

TABLE 52

| | Stage and amount of addition of deinking agent | | deinking agent (a)/(b) (wt. ratio) | Whiteness (%) | b value (%) | Unliberated ink No. |
|---|---|---|---|---|---|---|
| | deinking agent (wt. % based on starting material) | | | | | |
| Ex. No. | pulping stage (I) | chemical mixing stage (II) | | | | |
| 1 | 6 (0.15) | ε (0.35) | 30/70 | 58.8 | 11.4 | 0 |
| 2 | 6 (0.045) ε (0.105) | 6 (0.105) ε (0.245) | 30/70 | 57.6 | 10.7 | 4 |
| 3 | 7 (0.2) | ζ (0.3) | 40/60 | 58.2 | 11.3 | 1 |
| 4 | ζ (0.2) | 7 (0.3) | 40/60 | 55.3 | 10.1 | 6 |
| 5 | 7 (0.08) ζ (0.12) | 7 (0.12) ζ (0.18) | 40/60 | 57.1 | 10.5 | 6 |
| 6 | 8 (0.125) | η (0.375) | 25/75 | 58.1 | 11.3 | 0 |
| 7 | 8 (0.031) η (0.094) | 8 (0.094) η (0.281) | 25/75 | 56.4 | 10.7 | 5 |
| 8 | 9 (0.225) | η (0.275) | 45/55 | 58.2 | 11.2 | 0 |
| 9 | 9 (0.100) η (0.125) | 9 (0.125) η (0.15) | 45/55 | 56.5 | 10.7 | 5 |
| 10 | 9 (0.225) | θ (0.275) | 45/55 | 52.6 | 7.34 | 16 |
| 11 | 0 (0.15) | ε (0.35) | 30/70 | 59.2 | 11.3 | 2 |
| 12 | 0 (0.15) | ι (0.35) | 30/70 | 52.0 | 7.22 | 18 |
| 13 | 0 (0.06) 10 (0.14) | 0 (0.09) ι (0.21) | 30/70 | 52.1 | 7.24 | 19 |

EXAMPLE 19

In this Example, a deinking agent was added in portions in the pulping stage and before the flotation stage.

Recovered waste newspapers were cut into pieces (2×5 cm) and a given amount thereof was fed into a bench disintegrator. Then water, 0.2% (based on the starting material) of caustic soda and a given amount of each of the deinking agents listed in Tables 53 and/or 54 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 22%. Then 0.6% (based on the starting material) of caustic soda, 2.2% (based on the starting material) of sodium silicate No. 3 and 3.5% (based on the starting material) of 30% hydrogen peroxide were added thereto. After adjusting the pulp concentration to 22% with water, the slurry was mixed in the bench disintegrator for 1 minute and then kneaded with a biaxial laboratory kneader at 300 rpm. After diluting with water so as to give a pulp concentration of 4%, it was disintegrated again with the bench disintegrator for 30 seconds. Then a given amount of each of the deinking agents listed in Tables 53 and/or 54 was added to the obtained pulp slurry. After diluting with water so as to give a pulp concentration of 1%, the slurry was subjected to flotation at 30° C. for 10 minutes. After the completion of the flotation, the pulp slurry was concentrated with a 60-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 40. dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Table 55 shows the deinking performances of various deinking methods. In Table 54, all of the fatty acids contained in the deinking agents were in the form of sodium salts. Each of the higher fatty acid mixture x to x is prepared by blending individual sodium salts of the fatty acids with each other in such a manner as to give a composition of a specified carbon atom number.

TABLE 53

| No. | Surfactant: (a-1) to (a-4) | Mode of AO addition |
|---|---|---|
| 11 | (a-1) $C_{12}H_{25}O(EO)_{10}(PO)_5H$ | random |
| 12 | (a-1) $C_9H_{19}$—⟨○⟩—$O(EO)_8(PO)_4H$ | random |
| 13 | $C_6H_{13}O(EO)_{10}(PO)_5H$ | random |
| 14 | $C_{28}H_{57}O(EO)_5(PO)_5H$ | random |
| 15 | $C_{18}H_{37}O(EO)_{150}(PO)_{80}H$ | random |
| 16 | (a-2) $C_{15}H_{31}COO(CO)_{10}(BO)_5H$ | block |
| 17 | $C_5H_{11}COO(EO)_{18}(PO)_9H$ | block |
| 18 | $C_{17}H_{35}COO(EO)_2(PO)_1H$ | block |
| 19 | $C_{27}H_{55}COO(EO)_{10}(PO)_{10}H$ | block |

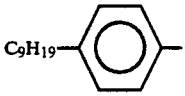

TABLE 53-continued

| No. | Surfactant: (a-1) to (a-4) | Mode of AO addition |
|---|---|---|
| 20 | $C_{17}H_{35}COO(EO)_{200}((PO)_{150}H$ | block |
| 21 | (a-3) $C_8H_{17}O(EO)_1(PO)_1SO_3Na$ | random |
| 22 | (a-4) coconut oil/pentaerythritol mixture (1/0.48 by mol) $(EO)_{35}(PO)_{19.4}$ | random |

TABLE 54

| | | | Higher fatty acid mixture: component (b) | | | | | | | | |
|---|---|---|---|---|---|---|---|---|---|---|---|
| | Average C | Iodine value | Fatty acid carbon No. composition (wt. %) | | | | | | | | |
| No. | atom No. | (IV) | $C_8$ | $C_9$ | $C_{10}$ | $C_{11}$ | $C_{12}$ | $C_{13}$ | $C_{14}$ | $C_{15}$ | $C_{16}$ |
| κ | 19.8 | 0.4 | 0 | 0 | 0 | 0 | 0 | 0 | 7.8 | 0 | 14.0 |
| λ | 17.7 | 0.9 | 4.2 | 0 | 10.3 | 0 | 8.9 | 0 | 6.4 | 0 | 8.8 |
| μ | 18.0 | 5.2 | 0 | 0 | 0 | 0 | 10.2 | 0 | 5.2 | 0 | 0 |
| ν | 12.8 | 0.7 | 0.2 | 0.04 | 21.1 | 0.06 | 63.6 | 0.05 | 0.2 | 0.06 | 0.2 |
| ξ | 9.7 | 1.8 | 89.1 | 0 | 0 | 0 | 0 | 0 | 0 | 0 | 0 |
| o | 13.2 | 6.7 | 16.0 | 0.02 | 0.1 | 0.01 | 27.7 | 0.04 | 45.7 | 0.01 | 0.4 |
| π | 19.4 | 2.8 | 0 | 0 | 0.5 | 0 | 0.8 | 0 | 15.7 | 0 | 12.0 |

| | Higher fatty acid mixture: component (b) | | | | | | | | Content of $C_{20}-C_{24}$ fatty acids |
|---|---|---|---|---|---|---|---|---|---|
| | Fatty acid carbon No. composition (wt. %) | | | | | | | | |
| No. | $C_{17}$ | $C_{18}$ | $C_{19}$ | $C_{20}$ | $C_{21}$ | $C_{22}$ | $C_{23}$ | $C_{24}$ | (wt. %) |
| κ | 0 | 17.4 | 0 | 18.1 | 0 | 20.3 | 0 | 22.4 | 60.8 |
| λ | 0 | 10.2 | 0 | 19.8 | 0 | 18.3 | 0 | 13.1 | 51.2 |
| μ | 0 | 60.3 | 0 | 8.0 | 0 | 16.3 | 0 | 0 | 24.3 |
| ν | 0.04 | 3.8 | 0.05 | 4.5 | 0.05 | 5.9 | 0.05 | 0.1 | 9.6 |
| ξ | 0 | 0 | 0 | 0 | 0 | 0 | 0 | 10.9 | 10.9 |
| o | 0.02 | 0.5 | 0 | 3.5 | 0.05 | 5.8 | 0.05 | 0.1 | 9.5 |
| π | 0 | 0.2 | 0.1 | 29.4 | 0.05 | 35.4 | 0.05 | 5.8 | 70.7 |

TABLE 55

| | Stage and amount of addition of deinking agent | | | | | |
|---|---|---|---|---|---|---|
| | deinking agent (wt. % based on starting material) | | deinking agent (a)/(b) | Whiteness | b value | Unliberated |
| Ex. No. | pulping stage (I) | chemical mixing stage (II) | (wt. ratio) | (%) | (%) | ink No. |
| 1 | 11 (0.2) | 11 (0.3) | 40/60 | 59.2 | 11.8 | 0 |
| 2 | 11 (0.02) κ (0.18) | 11 (0.03) κ (0.27) | 10/90 | 57.8 | 10.7 | 2 |
| 3 | 11 (0.08) κ (0.12) | 11 (0.12) κ (0.18) | 40/60 | 56.4 | 10.4 | 5 |
| 4 | 12 (0.15) | 12 (0.35) | 30/70 | 58.9 | 11.5 | 1 |
| 5 | 12 (0.06) λ (0.14) | 12 (0.09) λ (0.21) | 30/70 | 57.6 | 10.8 | 2 |
| 6 | 12 (0.2) | μ (0.3) | 40/60 | 59.0 | 11.6 | 0 |
| 7 | 12 (0.08) μ (0.12) | 12 (0.12) μ (0.18) | 40/60 | 55.4 | 10.2 | 5 |
| 8 | 16 (0.15) | λ (0.35) | 30/70 | 59.1 | 11.6 | 0 |
| 9 | ν (0.35) | 16 (0.15) | 30/70 | 55.5 | 11.0 | 3 |
| 10 | 21 (0.04) | ν (0.36) | 10/90 | 58.7 | 11.4 | 1 |
| 11 | 21 (0.02) ν (0.18) | 21 (0.02) ν (0.18) | 10/90 | 55.1 | 10.1 | 5 |
| 12 | 22 (0.1) | ν (0.4) | 20/80 | 58.9 | 11.5 | 5 |
| 13 | 22 (0.02) ν (0.08) | 22 (0.08) ν (0.32) | 20/80 | 55.3 | 10.2 | 5 |
| 14 | 11 (0.2) | μ (0.3) | 40/60 | 59.0 | 11.0 | 1 |
| 15 | 14 (0.2) | μ (0.3) | 40/60 | 54.8 | 9.99 | 10 |
| 16 | 14 (0.04) μ (0.16) | 14 (0.06) μ (0.24) | 20/80 | 51.4 | 7.58 | 15 |
| 17 | μ (0.2) | 14 (0.3) | 60/40 | 50.5 | 7.55 | 11 |
| 18 | 11 (0.2) | μ (0.3) | 40/60 | 59.9 | 11.3 | 1 |
| 19 | 13 (0.2) | μ (0.3) | 40/60 | 53.8 | 9.30 | 13 |
| 20 | 15 (0.2) | μ (0.3) | 40/60 | 53.8 | 8.91 | 10 |
| 21 | 17 (0.2) | μ (0.3) | 40/60 | 54.7 | 9.90 | 12 |
| 22 | 22 (0.1) | κ (0.4) | 20/80 | 59.3 | 11.0 | 2 |
| 23 | 22 (0.1) | ξ (0.4) | 20/80 | 50.3 | 6.63 | 30 |
| 24 | 22 (0.1) | o (0.4) | 20/80 | 49.9 | 6.42 | 29 |
| 25 | 22 (0.1) | π (0.4) | 20/80 | 49.8 | 6.42 | 29 |

As the above Examples show, a deinked pulp having a high whiteness and a high b value and contaminated with little unliberated ink can be obtained by adding one or more surfactants selected from among the compounds represented by the general formulae (a-1) to (a-3) and a reaction product obtained by adding an alkylene oxide to a mixture of a natural fat with a polyhydric alcohol (a-4) exclusively in the disintegration (pulping) stage of waste water and adding a mixture containing higher fatty acid(s) having 8 to 24 carbon atoms or salt(s) thereof, wherein the average carbon atom number of the fatty acids in the mixture ranges from 12.7 to 22.5, the content of higher fatty acid(s) having 20 to 24 carbon atoms or salt(s) thereof ranges from 9.6 to 70.6% by weight and the iodine value (IV) is not more than 45, exclusively in the mixing and/or flotation stages following the pulping stage, preferably at a specific ratio.

0.5% (based on the starting material) of each of the deinking agents listed in Table 57 were added thereto. After disintegrating at a pulp concentration of 15% at 45° C. for 12 minutes, the mixture was aged at 55° C. for 120 minutes. Next, the mixture was dehydrated with a high-speed dehydrator until the pulp concentration

TABLE 56

| No. | Average C atom No. | Iodine value (IV) | Fatty acid carbon No. composition (wt. %) | | | | | | | | |
|---|---|---|---|---|---|---|---|---|---|---|---|
| | | | $C_8$ | $C_9$ | $C_{10}$ | $C_{11}$ | $C_{12}$ | $C_{13}$ | $C_{14}$ | $C_{15}$ | $C_{16}$ |
| A | 12.8 | 0.7 | 0.2 | 0.04 | 21.1 | 0.06 | 63.6 | 0.05 | 0.2 | 0.06 | 0.2 |
| B | 13.1 | 2.8 | 16.1 | 0.02 | 0.1 | 0.01 | 40.5 | 0.01 | 30.7 | 0 | 0.3 |
| C | 14.5 | 0.9 | 9.7 | 0.02 | 2.3 | 0.01 | 10.5 | 0.02 | 41.5 | 0.02 | 22.9 |
| D | 15.6 | 1.7 | 5.6 | 0.01 | 0.5 | 0.01 | 3.7 | 0.02 | 29.6 | 0.02 | 44.8 |
| E | 16.8 | 2.1 | 3.2 | 0 | 7.0 | 0 | 2.1 | 0 | 0.3 | 0 | 36.7 |
| F | 17.4 | 3.5 | 1.2 | 0 | 3.2 | 0 | 2.1 | 0 | 12.4 | 0 | 10.4 |
| G | 18.2 | 1.9 | 3.8 | 0 | 0 | 0 | 0.1 | 0 | 0.1 | 0 | 0.1 |
| H | 18.9 | 5.4 | 0.2 | 0 | 0.2 | 0 | 0.3 | 0 | 0.3 | 0 | 14.6 |
| I | 19.3 | 4.7 | 0.1 | 0 | 0.1 | 0 | 0.2 | 0 | 0.2 | 0 | 36.1 |
| J | 20.4 | 1.8 | 0 | 0 | 0 | 0 | 0.1 | 0 | 0.1 | 0 | 19.4 |
| K | 21.2 | 7.6 | 0 | 0 | 0 | 0 | 0 | 0 | 0.1 | 0 | 2.9 |
| L | 22.3 | 6.2 | 0 | 0 | 0 | 0 | 0 | 0 | 0 | 0 | 0 |
| M | 12.8 | 1.7 | 0.2 | 0.04 | 21.1 | 0.06 | 63.6 | 0.05 | 0.2 | 0.06 | 0.2 |
| N | 14.5 | 7.3 | 9.7 | 0.02 | 2.3 | 0.01 | 10.5 | 0.02 | 41.5 | 0.02 | 22.9 |
| O | 15.6 | 18.9 | 5.6 | 0.01 | 0.5 | 0.01 | 3.7 | 0.02 | 29.6 | 0.02 | 44.8 |
| P | 16.8 | 26.6 | 3.2 | 0 | 7.0 | 0 | 2.1 | 0 | 0.3 | 0 | 36.7 |
| Q | 18.9 | 44.8 | 0.2 | 0 | 0.2 | 0 | 0.3 | 0 | 0.3 | 0 | 14.6 |
| R | 20.4 | 31.5 | 0 | 0 | 0 | 0 | 0.1 | 0 | 0.1 | 0 | 19.4 |
| S | 22.3 | 5.2 | 0 | 0 | 0 | 0 | 0 | 0 | 0 | 0 | 0 |
| T | 18.5 | 0.3 | 0 | 0 | 0 | 0 | 0 | 0 | 1.9 | 0 | 36.9 |
| U | 18.5 | 0.3 | 0 | 0 | 0 | 0 | 0 | 0 | 6.5 | 0 | 25.0 |
| V | 19.0 | 0.3 | 0 | 0 | 0 | 0 | 0 | 0 | 6.9 | 0 | 19.0 |
| W | 18.8 | 0.3 | 0 | 0 | 0 | 0 | 0 | 0 | 6.0 | 0 | 22.7 |
| X | 18.5 | 0.3 | 0 | 0 | 0 | 0 | 0 | 0 | 4.2 | 0 | 31.0 |
| Y | 18.5 | 23.5 | 0 | 0 | 0 | 0 | 0 | 0 | 1.9 | 0 | 36.9 |
| Z | 18.5 | 44.8 | 0 | 0 | 0 | 0 | 0 | 0 | 1.9 | 0 | 36.9 |

| No. | Fatty acid carbon No. composition (wt. %) | | | | | | | | Content of $C_{20}$-$C_{24}$ fatty acids (wt. %) |
|---|---|---|---|---|---|---|---|---|---|
| | $C_{17}$ | $C_{18}$ | $C_{19}$ | $C_{20}$ | $C_{21}$ | $C_{22}$ | $C_{23}$ | $C_{24}$ | |
| A | 0.04 | 3.8 | 0.05 | 4.5 | 0.05 | 5.9 | 0.05 | 0.1 | 9.6 |
| B | 0.01 | 0.4 | 0.05 | 4.7 | 0.05 | 6.9 | 0.05 | 0.1 | 11.8 |
| C | 0.01 | 0.5 | 0.02 | 4.8 | 0.05 | 7.5 | 0.05 | 0.1 | 12.5 |
| D | 0.01 | 0.6 | 0.03 | 5.1 | 0.05 | 9.8 | 0.05 | 0.1 | 12.8 |
| E | 0.06 | 34.1 | 0.04 | 5.6 | 0.05 | 10.7 | 0.05 | 0.1 | 16.5 |
| F | 0.04 | 52.8 | 0.06 | 5.8 | 0.05 | 11.4 | 0.05 | 0.5 | 17.8 |
| G | 0.07 | 74.5 | 0.03 | 5.3 | 0.05 | 13.4 | 0.05 | 1.1 | 30.5 |
| H | 0.05 | 47.0 | 0.05 | 15.4 | 0.05 | 18.1 | 0.05 | 3.7 | 37.3 |
| I | 0 | 9.2 | 0.1 | 16.5 | 0.1 | 26.9 | 0.1 | 10.4 | 54.0 |
| J | 0 | 17.6 | 0 | 17.9 | 0.1 | 21.2 | 0.1 | 23.5 | 62.8 |
| K | 0 | 32.9 | 0 | 4.2 | 0.1 | 20.6 | 0.1 | 39.1 | 64.1 |
| L | 0 | 18.4 | 11.6 | 0.2 | 0.1 | 0.2 | 0.1 | 69.4 | 70.7 |
| M | 0.04 | 3.5 | 0.05 | 4.5 | 0.05 | 6.2 | 0.05 | 0.1 | 10.9 |
| N | 0.01 | 0.5 | 0.02 | 4.8 | 0.05 | 7.5 | 0.05 | 0.1 | 12.5 |
| O | 0.01 | 0.6 | 0.03 | 5.1 | 0.05 | 9.8 | 0.05 | 0.1 | 12.8 |
| P | 0.06 | 34.1 | 0.04 | 5.6 | 0.05 | 10.7 | 0.05 | 0.1 | 16.5 |
| Q | 0.05 | 47.0 | 0.05 | 15.4 | 0.05 | 18.1 | 0.05 | 3.7 | 37.3 |
| R | 0 | 17.6 | 0 | 17.9 | 0.1 | 21.2 | 0.1 | 23.5 | 62.8 |
| S | 0 | 18.4 | 11.6 | 0.2 | 0.1 | 0.2 | 0.1 | 69.4 | 70.0 |
| T | 0 | 19.5 | 0 | 17.8 | 0 | 23.9 | 0 | 0 | 41.7 |
| U | 0 | 27.6 | 0 | 20.2 | 0 | 19.1 | 0 | 1.6 | 40.9 |
| V | 0 | 23.0 | 0 | 22.7 | 0 | 27.5 | 0 | 0.9 | 51.1 |
| W | 0 | 23.8 | 0 | 20.8 | 0 | 26.7 | 0 | 0 | 47.5 |
| X | 0 | 23.6 | 0 | 19.0 | 0 | 21.5 | 0 | 0 | 41.3 |
| Y | 0 | 19.5 | 0 | 17.8 | 0 | 23.9 | 0 | 0 | 41.7 |
| Z | 0 | 19.5 | 0 | 17.8 | 0 | 23.9 | 0 | 0 | 41.7 |

EXAMPLE 20

In this Example, a deinking agent was added as a whole in the pulping stage.

Recovered waste newspapers were cut into pieces (2×5 cm) and a given amount thereof was fed into a bench disintegrator. Then water, 0.8% (based on the starting material) of caustic soda, 2.2% (based on the starting material) of sodium silicate No. 3, 3.5% (based on the starting material) of 30% hydrogen peroxide and reached 23% and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Further, the foam volume at the flotation was measured as an indicator of the operation stability in the flotation stage. A foam volume ranging from 200 to 350 ml indicates good stability. When the foam volume is outside the above range, foaming troubles might occur.

Table 57 further shows the component (a), the composition of the component (b) and the weight ratio of the components (a) to (b) of each of the deinking agents used in the test, while Table 58 shows the deinking performance thereof.

EXAMPLE 21

In this Example, a deinking agent was added in portions in the pulping and chemical mixing stages.

Recovered waste newspapers were cut into pieces (2×5 cm) and a given amount thereof was fed into a bench disintegrator. Then water, 0.2% (based on the starting material) of caustic soda and 0.1% (based on the starting material) of each of the deinking agents listed in Table 59 were added thereto. After disintegrating at a pulp concentration of 15% at 46° C. for 12 minutes, the mixture was aged at 55° C. for 120 minutes. Next, the mixture was dehydrated with a high-speed dehydrator until the concentration reached 23%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Table 59 were added thereto. After adjusting the pulp concentration to 22% with water, the slurry was mixed in the bench disinte-

TABLE 57

| Deinking agent No. | | Component (a) fatty acid mixture | Component (b) | | | | | (a)/(b) (wt. ratio) |
|---|---|---|---|---|---|---|---|---|
| | | | natural fat (α) | polyhydric alcohol (β) | α/β (molar ratio) | alkylene oxide type, molar ratio | mol no. | |
| Invention products | 1 | A | coconut oil | pentaerythritol | 1/0.48 | EO/PO(1.8/1.0) | 54.4 | 70/30 |
| | 2 | B | beef tallow | 1,6-hexanediol | 1/0.5 | EO/PO(2.0/1.0) | 14.6 | 58/42 |
| | 3 | C | soybean oil | glycerol | 1/0.6 | EO/PO(2.2/1.0) | 30.0 | 88/12 |
| | 4 | D | rapeseed oil | erythritol | 1/1.5 | EO/PO(2.0/1.0) | 43.2 | 66/34 |
| | 5 | E | castor oil | pentaerythritol | 1/2 | EO/PO(2.0/1.0) | 55.0 | 74/26 |
| | 6 | F | linseed oil | stachyose | 1/1.2 | EO/PO(2.1/1.0) | 54.0 | 86/14 |
| | 7 | G | palm oil | mannitol | 1/0.8 | EO | 18.9 | 50/50 |
| | 8 | H | fish oil | sorbitol | 1/0.15 | PO | 18.0 | 85/15 |
| | 9 | I | hardened beef tallow (IV = 2.1) | arabitol | 1/0.25 | EO/BO(4.2/1.0) | 30.6 | 45/55 |
| | 10 | J | hardened fish oil (IV = 0.9) | ethylene glycol | 1/2.8 | EO/PO(1.9/1.0) | 15.8 | 62/38 |
| | 11 | K | hardened coconut oil (IV = 1.6) | 2-ethylbutane-1,2,3-triol | 1/2.4 | EO/PO(1.0/1.0) | 27.0 | 52/48 |
| | 12 | L | hardened palm oil (IV = 1.2) | sorbitol | 1/2.5 | EO/PO(0.25/1.0) | 42.2 | 90/10 |
| | 13 | A | coconut oil | pentaerythritol | 1/0.09 | EO/PO(1.8/1.0) | 54.4 | 70/30 |
| | 14 | A | coconut oil | pentaerythritol | 1/3.2 | EO/PO(1.8/1.0) | 54.2 | 70/30 |
| | 15 | A | coconut oil | pentaerythritol | 1/0.48 | EO/PO(1.8/1.0) | 4.2 | 70/30 |
| | 16 | H | fish oil | sorbitol | 1/0.08 | PO | 18.0 | 85/15 |
| | 17 | H | fish oil | sorbitol | 1/3.2 | PO | 18.0 | 85/15 |
| | 18 | H | fish oil | sorbitol | 1/0.15 | PO | 3.6 | 85/15 |

Note:
The alkylene oxide mol no. given in the above Table means the mol no. per mole of the natural fat (α) (the same will apply hereinafter).

TABLE 58

| Deinking agent No. | | Whiteness (%) | b value (%) | Unliberated ink no. |
|---|---|---|---|---|
| Invention products | 1 | 55.5 | 9.70 | 6 |
| | 2 | 55.4 | 9.81 | 7 |
| | 3 | 55.4 | 9.52 | 7 |
| | 4 | 55.3 | 10.0 | 7 |
| | 5 | 55.3 | 10.1 | 7 |
| | 6 | 55.2 | 10.0 | 8 |
| | 7 | 56.4 | 10.4 | 5 |
| | 8 | 56.9 | 10.8 | 2 |
| | 9 | 56.5 | 10.5 | 5 |
| | 10 | 56.0 | 9.58 | 8 |
| | 11 | 55.9 | 9.97 | 6 |
| | 12 | 55.8 | 9.74 | 7 |
| | 13 | 54.6 | 9.58 | 10 |
| | 14 | 54.5 | 9.56 | 10 |
| | 15 | 54.7 | 9.49 | 11 |
| | 16 | 54.4 | 9.51 | 11 |
| | 17 | 54.6 | 9.53 | 10 |
| | 18 | 54.7 | 9.48 | 12 | grator for 1 minute and then kneaded with a biaxial laboratory kneader at 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for minutes. During the flotation process, 0.4% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 5° dH with the use of $CaCl_2$ and $MgCl_2$ (Ca/Mg=8/2 by mol).

The whiteness and b value of the pulp sheet thus obtained were measured with a color difference meter and the unliberated ink spots contained therein were counted with an image analyzer (100×magnification).

Table 59 shows the component (a), the composition of the component (b) and the weight ratio of the components (a) to (b) of each of the deinking agents used in the test, while Table 60 shows the deinking performance thereof.

TABLE 59

| Deinking agent No. | | Component (a) fatty acid mixture | Component (b) | | $\alpha/\beta$ (molar ratio) | alkylene oxide | | (a)/(b) (wt. ratio) |
|---|---|---|---|---|---|---|---|---|
| | | | natural fat ($\alpha$) | polyhydric alcohol ($\beta$) | | type, molar ratio | mol no. | |
| Invention products | 42 | M | beef tallow | sorbitol | 1/0.2 | EO/PO(2.0/1.0) | 60.0 | 68/32 |
| | 43 | N | hardened bone oil (IV = 2.0) | propylene glycol | 1/1.2 | PO | 147.3 | 90/10 |
| | 44 | O | hardened beef tallow (IV = 0.6) | trimethylene glycol | 1/0.5 | EO | 80.6 | 82/18 |
| | 45 | P | coconut oil | butylene glycol | 1/2.2 | EO/PO(1.8/1.0) | 69.4 | 80/20 |
| | 46 | Q | olive oil | 1,1,1-trimethylolhexane | 1/1.5 | EO/PO(0.5/1.0) | 21.9 | 44/56 |
| | 47 | R | palm oil | 1,2,6-hexanetriol | 1/2.4 | EO | 18.3 | 62/38 |
| | 48 | S | hardened palm oil | diglycerol | 1/2.6 | PO | 37.2 | 73/27 |
| | 49 | M | beef tallow | sorbitol | 1/0.08 | EO/PO(2.0/1.0) | 60.0 | 68/32 |
| | 50 | M | beef tallow | sorbitol | 1/3.1 | EO/PO(2.0/1.0) | 60.0 | 68/32 |
| | 51 | M | beef tallow | sorbitol | 1/0.2 | EO/PO(2.0/1.0) | 3.0 | 68/32 |

TABLE 60

| Deinking agent No. | | Whiteness (%) | b value (%) | Unliberated ink no. |
|---|---|---|---|---|
| Invention products | 42 | 55.7 | 10.2 | 5 |
| | 43 | 55.5 | 10.1 | 6 |
| | 44 | 55.6 | 10.1 | 6 |
| | 45 | 55.5 | 10.0 | 7 |
| | 46 | 56.6 | 10.7 | 3 |
| | 47 | 56.4 | 10.4 | 4 |
| | 48 | 56.3 | 10.3 | 4 |
| | 49 | 54.1 | 9.43 | 11 |
| | 50 | 54.6 | 9.38 | 13 |
| | 51 | 54.3 | 9.49 | 12 |

EXAMPLE 22

In this Example, a deinking agent was added in portions in the pulping and kneading stages.

Recovered waste newspapers were cut into pieces (2×5 cm) and a given amount thereof was fed into a bench disintegrator. Then water, 0.2% (based on the starting material) of caustic soda and 0.3% (based on the starting material) of each of the deinking agents listed in Table 61 were added thereto. After disintegrating at a pulp concentration of 15% at 45° C. for 12 minutes, the mixture was aged at 55° C. for 120 minutes. Next, the mixture was dehydrated with a high-speed dehydrator until the concentration reached 28%. Then 0.6% (based on the starting material) of caustic soda, 2.2% (based on the starting material) of sodium silicate No. 3, 3.5% (based on the starting material) of 30% hydrogen peroxide and 0.2% (based on the starting material) of each of the deinking agents listed in Table 61 were added thereto. After adjusting the pulp concentration to 22% with water, the slurry was mixed in the bench disintegrator for 1 minute and then kneaded with a biaxial laboratory kneader for 300 rpm. After diluting with water so as to give a pulp concentration of 4%, it was disintegrated again with the bench disintegrator for 30 seconds. The obtained slurry was diluted with water so as to give a pulp concentration of 1% and then subjected to flotation at 30° C. for 10 minutes. During the flotation process, 0.5% (based on the starting material) of $CaCl_2$ was added thereto. After the completion of the flotation, the pulp slurry was concentrated with an 80-mesh wire to thereby give a concentration of 4%. Then it was diluted with water so as to give a pulp concentration of 1% and treated with a TAPPI standard sheet machine to thereby give a pulp sheet.

The hardness of the employed water was adjusted to 10° dH with the use of $CaCl_2$ and $MgCl_2$ (Ca/Mg=8/2 by mol).

The whiteness and b value of the pulp sheet thus obtained was measured with a color difference meter and the unliberated ink spots contained therein were counted with an image analyzer (100×magnification).

Table 61 shows the component (a), the composition of the component (b) and the weight ratio of the components (a) to (b) of each of the tested deinking agents, while Table 62 shows the deinking performance thereof.

The components (a) listed in Table 61 were cod, sardine, saury and mackerel oil fatty acids (No. 74–No. 77; T, U, V and W) and the one of No. 78 (X) was a mixture of the components (a) of No. 74 (T) and No. 75 (U) at a weight ratio of 50/50. Those of No. 79 to No. 80 (Y and Z) were prepared by varying the iodine value (IV) of the one of No. 75 (T).

TABLE 61

| Deinking agent No. | | Component (a) fatty acid mixture | Component (b) | | $\alpha/\beta$ (molar ratio) | alkylene oxide | | (a)/(b) (wt. ratio) |
|---|---|---|---|---|---|---|---|---|
| | | | natural fat ($\alpha$) | polyhydric alcohol ($\beta$) | | type, molar ratio | mol no. | |
| Invention products | 74 | T | hardened beef tallow (IV = 2.0) | glycerol | 1/0.6 | EO/PO(1.8/1.0) | 81.0 | 81/19 |
| | 75 | U | coconut oil | cellotriose | 1/0.3 | EO/PO(2.0/1.0) | 121.2 | 72/28 |
| | 76 | V | linseed oil | cellobiose | 1/0.8 | EO/PO(2.2/1.0) | 98.7 | 63/37 |
| | 77 | W | hardened fish oil (IV = 0.8) | ethylene glycol | 1/1.6 | EO/PO(3.0/1.0) | 53.2 | 55/45 |
| | 78 | X | soybean oil | pentaerythritol | 1/1.2 | EO/PO(6.2/1.0) | 113.5 | 88/12 |
| | 79 | Y | palm oil | D-glycero-D-galactoheptose | 1/0.7 | EO/PO(0.4/1.0) | 187.3 | 87/13 |

TABLE 61-continued

| Deinking agent No. | Component (a) fatty acid mixture | Component (b) natural fat (α) | polyhydric alcohol (β) | α/β (molar ratio) | alkylene oxide type, molar ratio | mol no. | (a)/(b) (wt. ratio) |
|---|---|---|---|---|---|---|---|
| 80 | Z | rapeseed oil | propylene glycol | 1/2.1 | EO/PO(0.2/1.0) | 51.6 | 52/48 |

TABLE 62

| Deinking agent No. | | Whiteness (%) | b value (%) | Unliberated ink no. |
|---|---|---|---|---|
| Invention products | 74 | 56.5 | 10.8 | 1 |
| | 75 | 56.6 | 10.9 | 1 |
| | 76 | 56.7 | 10.9 | 1 |
| | 77 | 56.5 | 10.7 | 1 |
| | 78 | 56.6 | 10.9 | 0 |
| | 79 | 56.7 | 10.9 | 1 |
| | 80 | 56.7 | 10.7 | 1 |

What is claimed is:

1. A deinking composition for use in the reclamation of waste paper consisting essentially of a mixture of higher fatty acids having 8 to 24 carbon atoms, or salts thereof, wherein the average carbon atom number of said fatty acids in said mixture ranges from 12.7 to 21.5, and wherein the content of higher fatty acids having 20 to 24 carbon atoms or salts thereof, ranges from 9.6 to 70.6% by weight, said mixture having an iodine value (IV) of not greater than 45.

2. A deinking composition for use in the reclamation of waste paper consisting essentially of:
   (a) a mixture of higher fatty acids having 8 to 24 carbon atoms, or salts thereof, wherein the average carbon atom number of said fatty acids in said mixture ranges from 12.7 to 21.5, and wherein the content of higher fatty acids having 20 to 24 carbon atoms or salts thereof ranges from 9.6 to 70.6% by weight, said mixture having an iodine value (IV) of not more than 45; and
   (b) at least one surfactant selected from the group consisting of compounds represented by the following general formulae (a-1), (a-2), (a-3) and (a-4) which follows:

$$R_1-O-(-AO-)_p-H \quad (a-1)$$

wherein $R_1$ represents an alkyl or alkenyl group having 8 to 24 carbon atoms or an alkylphenyl group wherein said alkyl group has 6 to 14 carbon atoms,
   AO represents an alkylene oxide having 2 to 4 carbon atoms which may be either a block polymer chain or a random polymer chain wherein two or more kinds of the alkylene oxide are present; and p is 1 or above so as to result in a total molecular weight of from 800 to 10,000;

$$R_2-COO-(-AO-)_m-H \quad (a-2)$$

wherein $R_2$ represents an alkyl or alkenyl group having 7 to 23 carbon atoms,
   AO represents an alkylene oxide having 2 to 4 carbon atoms which may be either a block polymer chain or a random polymer chain wherein two or more types of the alkylene oxide are present; and m is 1 or above so as to result in a total molecular weight of from 800 to 10,000;

$$R_3-O-(-AO-)_n-SO_3M \quad (a-3)$$

wherein $R_3$ represents an alkyl, alkenyl or cycloalkyl group having 8 to 24 carbon atoms or an alkylphenyl group wherein said alkyl has from 8 to 12 carbon atoms,
   AO represents an alkylene oxide having 2 to 4 carbon atoms which may be either a block polymer chain or a random polymer chain wherein two or more types of the alkylene oxide are present;
   n is from 1 to 5; and
   (a-4) a reaction product of an alkylene oxide with a mixture of a natural fat and polyhydric alcohol; and
   M represents an alkali metal or ammonium ion.

3. In a method for deinking printed waste paper by the flotation method, the washing method, or a combination of said flotation or washing method by adding a deinking composition during said method, the improvement being adding a deinking composition consisting essentially of a mixture of higher fatty acids having 8 to 24 carbon atoms, or salts thereof, wherein the average carbon atom number of said fatty acids in said mixture ranges from 12.7 to 21.5, and wherein the content of higher fatty acids having 20 to 24 carbon atoms or salts thereof, ranges from 9.6 to 70.6% by weight, said mixture having an iodine value (IV) of not greater than 45.

4. In a method for deinking printed waste paper by the flotation method, the washing method, or a combination of said flotation or washing method by adding a deinking composition during said method, the improvement being adding a deinking composition consisting essentially of:
   (a) a mixture of higher fatty acids having 8 to 24 carbon atoms, or salts thereof, wherein the average carbon atom number of said fatty acids in said mixture ranges from 12.7 to 21.5, and wherein the content of higher fatty acids having 20 to 24 carbon atoms or salts thereof ranges from 9.6 to 70.6% by weight, said mixture having an iodine value (IV) of not more than 45; and
   (b) at least one surfactant selected from the group consisting of compounds represented by the following general formulae (a-1), (a-2), (a-3) and (a-4) which follows:

$$R_1-O-(-AO-)_p-H \quad (a-1)$$

wherein $R_1$ represents an alkyl or alkenyl group having 8 to 24 carbon atoms or an alkylphenyl group wherein said alkyl group has 6 to 14 carbon atoms;
   AO represents an alkylene oxide having 2 to 4 carbon atoms which may be either a block polymer chain or a random polymer chain wherein two or more kinds of the alkylene oxide are present; and p is 1 or above so as to result in a total molecular weight of from 800 to 10,000;

$$R_2-COO-(-AO-)_m-H \quad (a-2)$$

wherein $R_2$ represents an alkyl or alkenyl group having 7 to 23 carbon atoms;

AO represents an alkylene oxide having 2 to 4 carbon atoms which may be either a block polymer chain or a random polymer chain wherein two or more types of the alkylene oxide are present; and m is 1 or above so as to result in a total molecular weight of from 800 to 10,000; and $$R_3\text{—}O\text{—}(\text{—}AO\text{—})_n\text{—}SO_3M \qquad (a\text{-}3)$$

wherein $R_3$ represents an alkyl, alkenyl or cycloalkyl group having 8 to 24 carbon atoms or an alkylphenyl group wherein said alkyl has from 8 to 12 carbon atoms;

AO represents an alkylene oxide having 2 to 4 carbon atoms which may be either a block polymer chain or a random polymer chain wherein two or more types of the alkylene oxide are present;

n is from 1 to 5; and (a-4) a reaction product of an alkylene oxide with a mixture of a natural fat and polyhydric alcohol; and M represents an alkali metal or ammonium ion.

5. A deinking method for reclaiming ink-containing waste paper having a pulping stage and a mixing or flotation stage which comprises:

(a) adding during said pulping stage, a deinking composition comprising a mixture of higher fatty acids having 8 to 24 carbon atoms, or salts thereof, wherein the average carbon atom number of said fatty acids in said mixture ranges from 12.7 to 21.5, and wherein the content of higher fatty acids having 20 to 24 carbon atoms or salts thereof, ranges from 9.6 to 70.6% by weight, said mixture having an iodine value (IV) of not greater than 45; and (b) adding during said mixing or flotation stage, at least one surfactant selected from the group consisting of compounds represented by the following general formulae (a-1), (a-2), (a-3) and (a-4) which follow:

$$R_1\text{—}O\text{—}(\text{—}AO\text{—})_p\text{—}H \qquad (a\text{-}1)$$

wherein $R_1$ represents an alkyl or alkenyl group having 8 to 24 carbon atoms or an alkylphenyl group wherein said alkyl group has 6 to 14 carbon atoms;

AO represents an alkylene oxide having 2 to 4 carbon atoms which may be either a block polymer chain or a random polymer chain wherein two or more kinds of the alkylene oxide are present; and p is 1 or above so as to result in a total molecular weight of from 800 to 10,000;

$$R_2\text{—}COO\text{—}(\text{—}AO\text{—})_m\text{—}H \qquad (a\text{-}2)$$

wherein $R_2$ represents an alkyl or alkenyl group having 7 to 23 carbon atoms;

AO represents an alkylene oxide having 2 to 4 carbon atoms which may be either a block polymer chain or a random polymer chain wherein two or more types of the alkylene oxide are present; and m is 1 or above so as to result in a total molecular weight of from 800 to 10,000; and $$R_3\text{—}O\text{—}(\text{—}AO\text{—})_n\text{—}SO_3M \qquad (a\text{-}3)$$

wherein $R_3$ represents an alkyl, alkenyl or cycloalkyl group having 8 to 24 carbon atoms or an alkylphenyl group wherein said alkyl has from 8 to 12 carbon atoms;

AO represents an alkylene oxide having 2 to 4 carbon atoms which may be either a block polymer chain or a random polymer chain wherein two or more types of the alkylene oxide are present; n is from 1 to 5; and (a-4) a reaction product of an alkylene oxide with a mixture of a natural fat and polyhydric alcohol; and M represents an alkali metal or ammonium ion.

6. The deinking composition according to claim 2, wherein the ratio of (a-4)/(b) is in the range of 10/90 — 70/30.

* * * * *